United States Patent
Funami

(10) Patent No.: US 10,176,552 B2
(45) Date of Patent: Jan. 8, 2019

(54) NON-TRANSITORY COMPUTER-READABLE STORAGE MEDIUM, IMAGE DISPLAY METHOD, AND IMAGE PROCESSING SYSTEM FOR ASSOCIATING THE SAME OBJECT IN DIFFERENT IMAGES

(71) Applicant: Atsushi Funami, Tokyo (JP)

(72) Inventor: Atsushi Funami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/371,356

(22) Filed: Dec. 7, 2016

(65) Prior Publication Data

US 2017/0169541 A1 Jun. 15, 2017

(30) Foreign Application Priority Data

Dec. 10, 2015 (JP) ................................ 2015-241294

(51) Int. Cl.
| | | |
|---|---|---|
| *G06T 3/00* | (2006.01) | |
| *G06T 7/70* | (2017.01) | |
| *G06K 9/00* | (2006.01) | |
| *G06F 3/0484* | (2013.01) | |
| *G06T 11/60* | (2006.01) | |

(52) U.S. Cl.
CPC ........ *G06T 3/0087* (2013.01); *G06F 3/04845* (2013.01); *G06K 9/00671* (2013.01); *G06T 7/70* (2017.01); *G06T 11/60* (2013.01); *G06T 2207/10004* (2013.01)

(58) Field of Classification Search
CPC ..... G06T 3/0087; G06T 9/00671; G06T 7/70; G06T 11/60; G06T 2207/10004; G06F 3/04845; G06K 9/00671
See application file for complete search history.

(56) References Cited

U.S. PATENT DOCUMENTS

| | | | | |
|---|---|---|---|---|
| 6,998,987 B2* | 2/2006 | Lin | ................... | G08B 13/19608 |
| | | | | 340/571 |
| 7,003,136 B1* | 2/2006 | Harville | ............. | G06K 9/00201 |
| | | | | 348/169 |

(Continued)

FOREIGN PATENT DOCUMENTS

| | | |
|---|---|---|
| JP | 2008-234234 | 10/2008 |
| JP | 2011-527483 | 10/2011 |

*Primary Examiner* — Tung T Vo
(74) *Attorney, Agent, or Firm* — IPUSA, PLLC

(57) ABSTRACT

A computer program product for being executed on a computer causes an information processing apparatus to execute a process including reading an image data item from an image storage unit, and reading object information from an object information storage unit in which the object information relating to an object shown in the image data item is stored in association with identification information for identifying the object; displaying, by a display device, the image data items that have been read and the object information; accepting a selection of the object based on the object information, and accepting a specification of a position of the object with respect to the image data item; and displaying, in association with each other, the specified positions of the objects that have the same identification information, among the objects shown in different image data items for which the specifications of the positions have been accepted.

13 Claims, 33 Drawing Sheets

(56) References Cited

U.S. PATENT DOCUMENTS

| | | | |
|---|---|---|---|
| 7,151,454 B2* | 12/2006 | Washington | G06K 7/10079 340/572.1 |
| 7,546,602 B2* | 6/2009 | Hejlsberg | G06F 9/54 717/114 |
| 9,436,425 B2 | 9/2016 | Hickman | |
| 9,664,510 B2* | 5/2017 | Nathan | G01B 21/00 |
| 9,740,895 B1* | 8/2017 | Liu | G06K 7/10366 |
| 9,883,101 B1* | 1/2018 | Aloumanis | H04N 5/23238 |
| 2004/0013243 A1* | 1/2004 | Harris | H04M 1/57 379/67.1 |
| 2004/0153671 A1* | 8/2004 | Schuyler | G07C 9/00 726/9 |
| 2004/0164858 A1* | 8/2004 | Lin | G08B 13/19608 340/522 |
| 2008/0192978 A1* | 8/2008 | Rundle | B07C 1/00 382/101 |
| 2013/0107057 A1* | 5/2013 | Zhou | H04N 5/4403 348/169 |
| 2014/0379296 A1* | 12/2014 | Nathan | G06Q 10/08 702/150 |
| 2015/0095784 A1 | 4/2015 | Funami et al. | |
| 2016/0005229 A1* | 1/2016 | Lee | G06F 3/0488 345/419 |
| 2016/0110415 A1* | 4/2016 | Clark | G06F 17/30451 707/774 |

\* cited by examiner

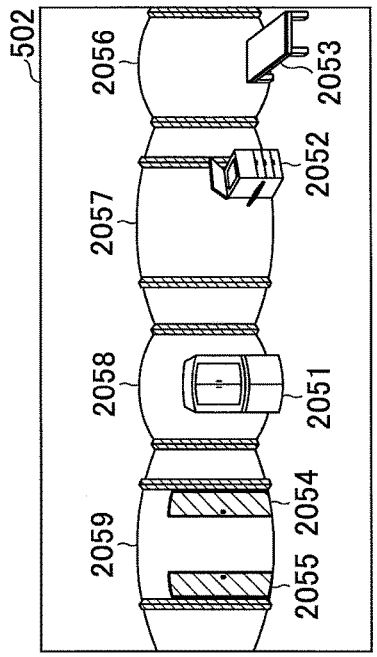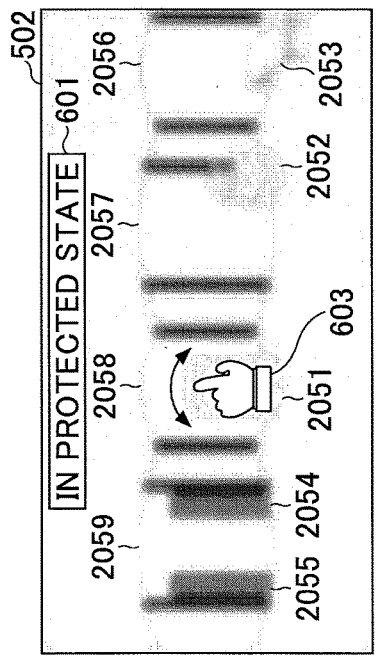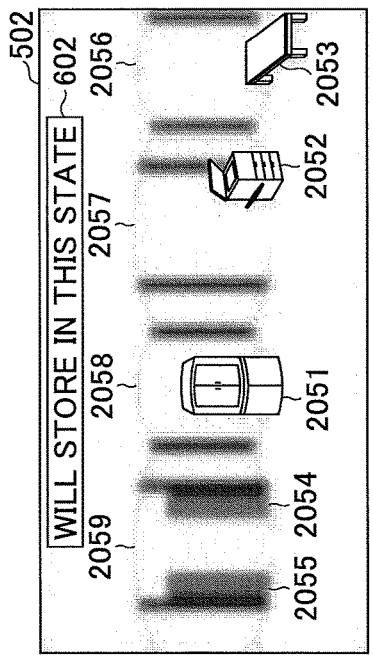

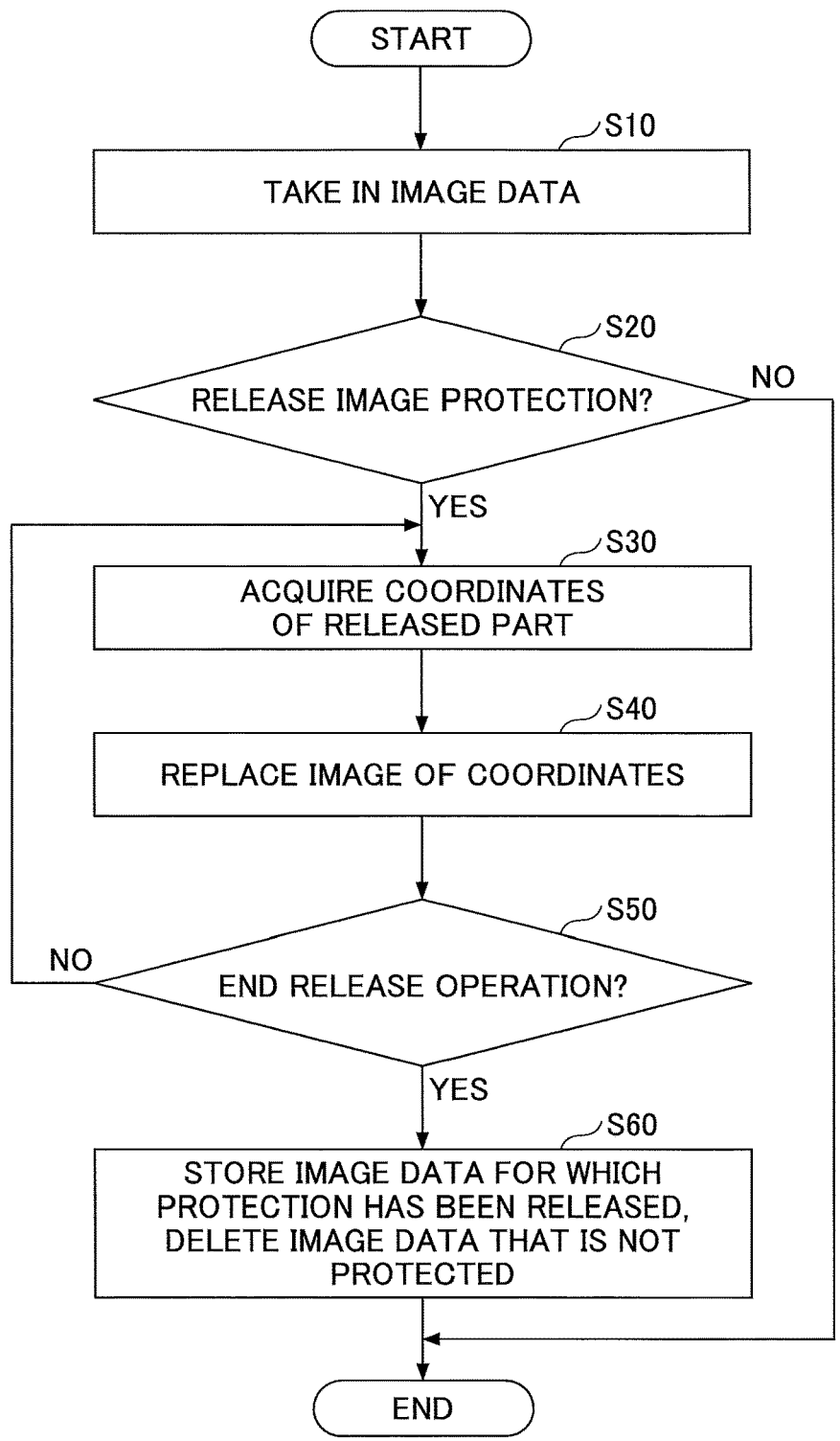

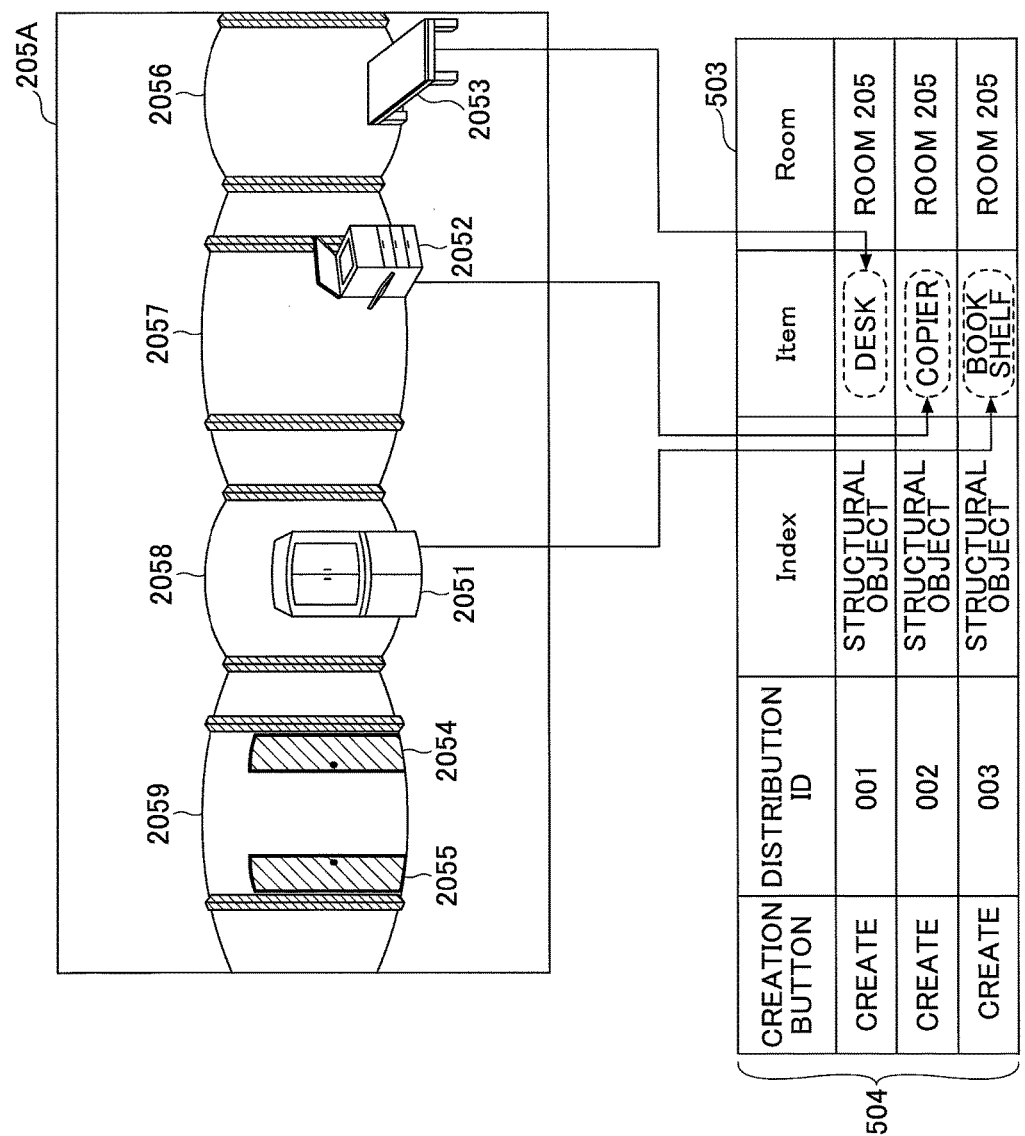

NON-TRANSITORY COMPUTER-READABLE STORAGE MEDIUM, IMAGE DISPLAY METHOD, AND IMAGE PROCESSING SYSTEM FOR ASSOCIATING THE SAME OBJECT IN DIFFERENT IMAGES

CROSS-REFERENCE TO RELATED APPLICATION

The present application claims the benefit of priority under 35 U.S.C. § 119 of Japanese Patent Application No. 2015-241294, filed on Dec. 10, 2015, the contents of which are incorporated herein by reference in their entirety.

BACKGROUND OF THE INVENTION

1. Field of the Invention

The present invention relates to a computer program product, an image display method, and an image processing system.

2. Description of the Related Art

Along with the popularization of digital cameras that can store image data in a digital form and technological advances, it has become possible to use image data having a wider angle of view than the angle of view of the conventional image data. As a method of capturing image data having a wide angle of view, there is a method of capturing images with a camera exclusively used for capturing image data having a wide angle of view, or a method of combining image data items captured with a conventional digital camera into a single image data item.

There is no clear definition for the size of the angle of view of the image data or the address term of such image data; however, a panoramic image having an angle of view of 180 degrees through 360 degrees in the horizontal direction and an omnidirectional image captured by an angle of view of 360 degrees in both the horizontal direction and the vertical direction, etc., are known. When image data having a wide angle of view can be used, the user can select any direction of the image to be displayed on a display.

SUMMARY OF THE INVENTION

An aspect of the present invention provides computer program product, an image display method, and an image processing system in which one or more of the above-described disadvantages are reduced.

According to one aspect of the present invention, there is provided a computer program product for being executed on a computer to cause an information processing apparatus to execute a process including reading an image data item from an image storage unit storing a plurality of image data items, and reading object information from an object information storage unit in which the object information relating to an object shown in the image data item is stored in association with identification information for identifying the object; displaying, by a display device, a plurality of the image data items that have been read and the object information; accepting a selection of the object based on the object information displayed by the display device, and accepting a specification of a position of the object with respect to the image data item displayed by the display device; and displaying, in association with each other, the specified positions of the objects that have the same identification information, among the objects shown in different ones of the image data items for which the specifications of the positions have been accepted.

BRIEF DESCRIPTION OF THE DRAWINGS

Other objects, features and advantages of the present invention will become more apparent from the following detailed description when read in conjunction with the accompanying drawings, in which:

FIGS. 8A through 8C are examples of diagrams for describing the release of image protection according to an embodiment of the present invention;

FIG. 9 is an example of a flowchart indicating procedures of releasing the protection of image data by the image processing application according to an embodiment of the present invention;

FIGS. 18A and 18B are examples of diagrams for schematically describing the input of object information in the information display field according to an embodiment of the present invention;

DETAILED DESCRIPTION OF THE PREFERRED EMBODIMENTS

A problem to be solved by an embodiment of the present invention is to provide a program by which the user can easily distinguish the same object captured in different image data items.

In the method of the background art of providing image data having a wide angle of view to a user, there is a problem in that the user cannot easily distinguish the same object captured in different image data items. This point is described below.

First, when image data having a wide angle of view is created from a plurality of image data items, the plurality of image data items are combined such that the same object included in the image data items are superimposed by matching the images, and only one same object remains in the combined image. Alternatively, the image data items may be combined such that only one image data item in which the same object is captured remains, and the same object is deleted from the other image data items. Therefore, the same object will not be captured in different image data items.

Furthermore, when a plurality of image data items having a wide angle of view are captured, the same object is likely to be captured in the different image data items because the image data items have a wide angle of view. However, in the technology of the background art, when there are a plurality of image data items, the association between the objects that are the same captured in the plurality of image data items has been unclear.

According to one embodiment of the present invention, a program is provided, by which the user can easily distinguish the same object captured in different image data items.

Embodiments of the present invention will be described by referring to the accompanying drawings.

<Outline of Image Processing Application>

Figure 1:
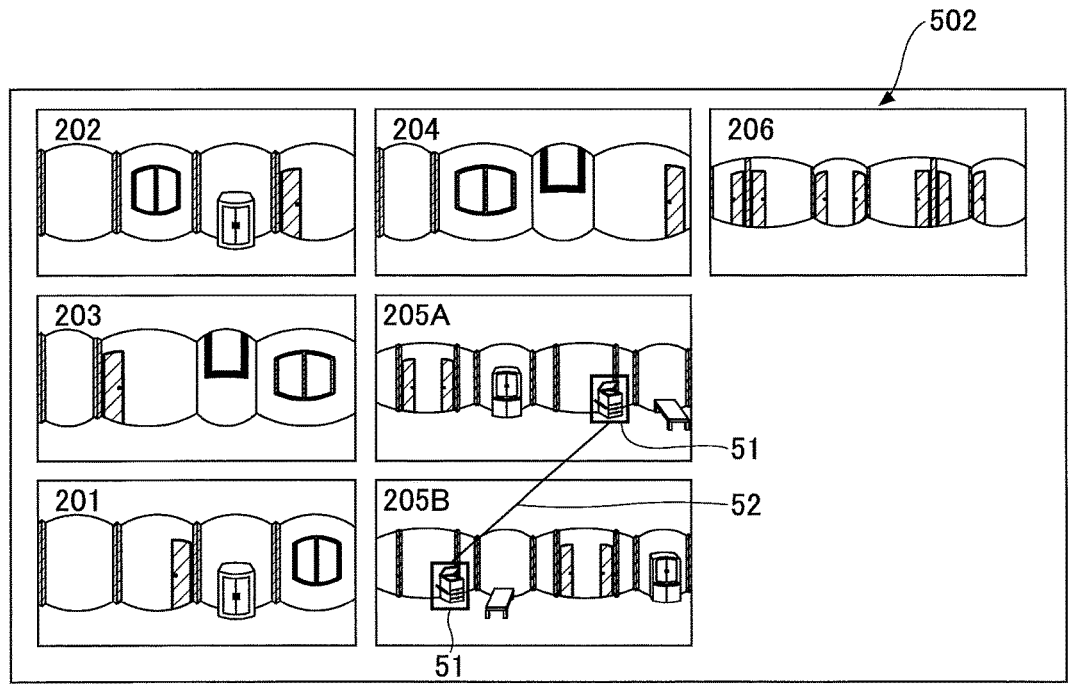
FIG. 1 is an example of a diagram illustrating a list of a plurality of image data items displayed on a display device of a user terminal according to an embodiment of the present invention.

FIG. 1 is an example of a diagram illustrating a list of a plurality of image data items displayed on a display device of a user terminal. The user terminal is described below. In FIG. 1, seven image data items 201 through 206 are arranged in a table format. Note that the reference numerals of the image data items 201 through 206 correspond to the numbers of the rooms and the hallway described below. Each of the seven image data items 201 through 206 is an omnidirectional image obtained by capturing 360 degrees in the horizontal direction and the vertical direction (hereinafter, simply referred to as "surrounding"). The user operates an image processing application operating at the user terminal, to apply a tag 51 to an object captured in the image data. In FIG. 1, the tag 51 is applied to an object (a copier in the figure) in the image data 205A. When the tag 51 is applied, a user terminal 100 displays the tag 51 on the object in the image data 205A. Details of the tag 51 are described below.

Furthermore, the user applies the tag 51 to the same object (a copier in the figure) captured in the image data 205B. The objects that are the same shown in a plurality of image data items can be distinguished as the same object by a distribution ID described below. Accordingly, the image processing application connects the tag 51 in the image data 205A and the tag 51 in the image data 205B with a line 52. Therefore, when the same object is likely to be captured in a plurality of image data items because the angle of view is wide as in an omnidirectional image, the user can apply the same tag 51 to the same object to perceive, at a glance, the association between the objects that are the same shown in a plurality of image data items.

Note that the image processing application described above is expected to be used in various scenes; however, in the present embodiment, moving is described as an example of a usage scene in the present embodiment. When moving between offices or houses, etc., for example, a mover needs to visit the office or the house, etc., that is the moving source, and perceive the kinds of objects to be conveyed (conveyance object) and the number of conveyance objects. The mover perceives this information in order to determine the size of the truck and the number of workers to be used for conveyance.

When the image processing application according to the present embodiment is used by a mover, each room of the office or the house, etc., that is the moving source only needs to be captured once such that approximately all of the objects to be conveyed are shown in the image data. The mover is able to organize the conveyance objects by listing up the conveyance objects in the image processing application and applying tags 51 to the conveyance objects. Furthermore, the condition of each room can be captured in a single image data item, and therefore the mover can appropriately arrange a plurality of image data items as in FIG. 1 to create a floor plan of an office or a house, etc. (the image data items can be arranged in the same arrangement as the floor plan). At this time, the tags 51 applied to the conveyance objects that are the same are connected by the line 52, and therefore the association between objects can be easily perceived. Therefore, the association between the rooms of an office or a house, etc., and the conveyance objects can be easily perceived at a glance, and the moving task of confirming the kinds of conveyance objects and the number of conveyance objects can be easily performed.

Terminology

The tag 51 is a shipping tag. The tag 51 is used because the scene to which the image processing application is applied is moving. However, visible information, which indicates that objects shown in a plurality of image data items are the same object, does not have to be referred to as a "tag". For example, a simple label may be used instead of the tag. A label means a notice acting as an eyemark; however, any kind of visible information that indicates an object in the image data may be used. This label is displayed in a shape such as a rectangle near the object. Therefore, a label is indication information that indicates the object.

In the present embodiment, an omnidirectional image, which is obtained by capturing the surrounding 360 degrees, is described as an example of the image data. However, the image processing application may also be applied to image data having a regular angle of view.

Furthermore, an object is a subject that is captured in the image data, and a conveyance object is an object to be conveyed among the objects. For example, an object that can be moved is a conveyance object, and a door attached to the room is not a conveyance object. However, the person in charge at the moving source and the mover, etc., can determine whether to convey and object, and therefore a conveyance object and an object that is not to be conveyed do not have to be precisely distinguished from each other.

A user is the person using the image processing application, and a mover is an example of a user. In the present embodiment, even when the mover is using the image processing application, "user" may be used as the subject in the descriptions.

<System Configuration>

Figure 2:
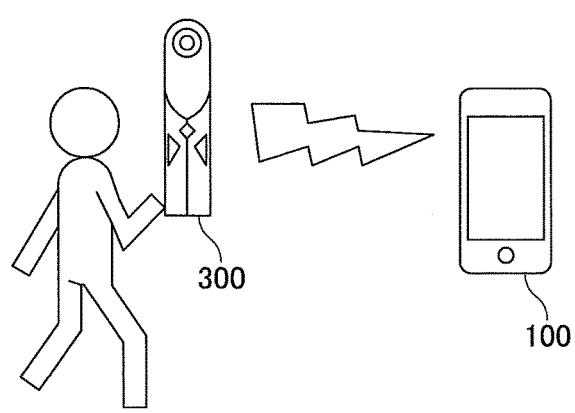
FIG. 2 is an example of a system configuration diagram illustrating an outline of an image processing system according to an embodiment of the present invention.

FIG. 2 is an example of a system configuration diagram illustrating the outline of an image processing system 500. The user is holding an imaging device 300, and captures an image of the surrounding at an appropriate location. The user can use the imaging device 300 to capture an image of the scenery of 360 degrees in the surrounding, by one operation. The imaging device 300 does not have to be an exclusive-use camera; the imaging device 300 may be a general digital camera (a digital still camera and a digital video camera, etc.). In this case, the user uses the digital camera to capture several images of the scenery from different visual lines, and sends a plurality of image data items to an information processing apparatus. In the information processing apparatus, an application for combining a plurality of image data items is installed, and the application combines the plurality of image data items and creates an omnidirectional image.

Furthermore, the imaging device 300 may be a camera that is built in an information processing terminal such as a smartphone. Alternatively, the imaging device 300 may be externally attached to an information processing apparatus.

Furthermore, the image processing system 500 includes the user terminal 100. The user terminal 100 is an information processing apparatus such as a tablet terminal, a personal computer (PC), a personal digital assistant (PDA), an electronic blackboard, a TV conference terminal, a wearable PC, a game console, a mobile phone, a car navigation system, and a smartphone, etc. However, the user terminal 100 is not so limited. The imaging device 300 and the user terminal 100 communicate with each other by a wireless local area network (LAN) and Bluetooth (registered trademark), and the image data captured by the imaging device 300 is sent to the user terminal 100. The imaging device 300 and the user terminal 100 may communicate with each other by a wired line such as a Universal Serial Bus (USB) cable. Furthermore, the user may operate the user terminal 100 to download, to the user terminal 100, the image data that has been sent by the imaging device 300 to the server by a wireless LAN or a mobile phone network.

Note that, considering that the user applies the tag 51 while confirming the status of the site of the moving task, the user terminal 100 is preferably a terminal that is highly portable and that has a large display, such as a tablet terminal. However, the user terminal 100 may suffice as long as the image processing application can operate in the user terminal 100.

<Hardware Configuration>

Figure 3:
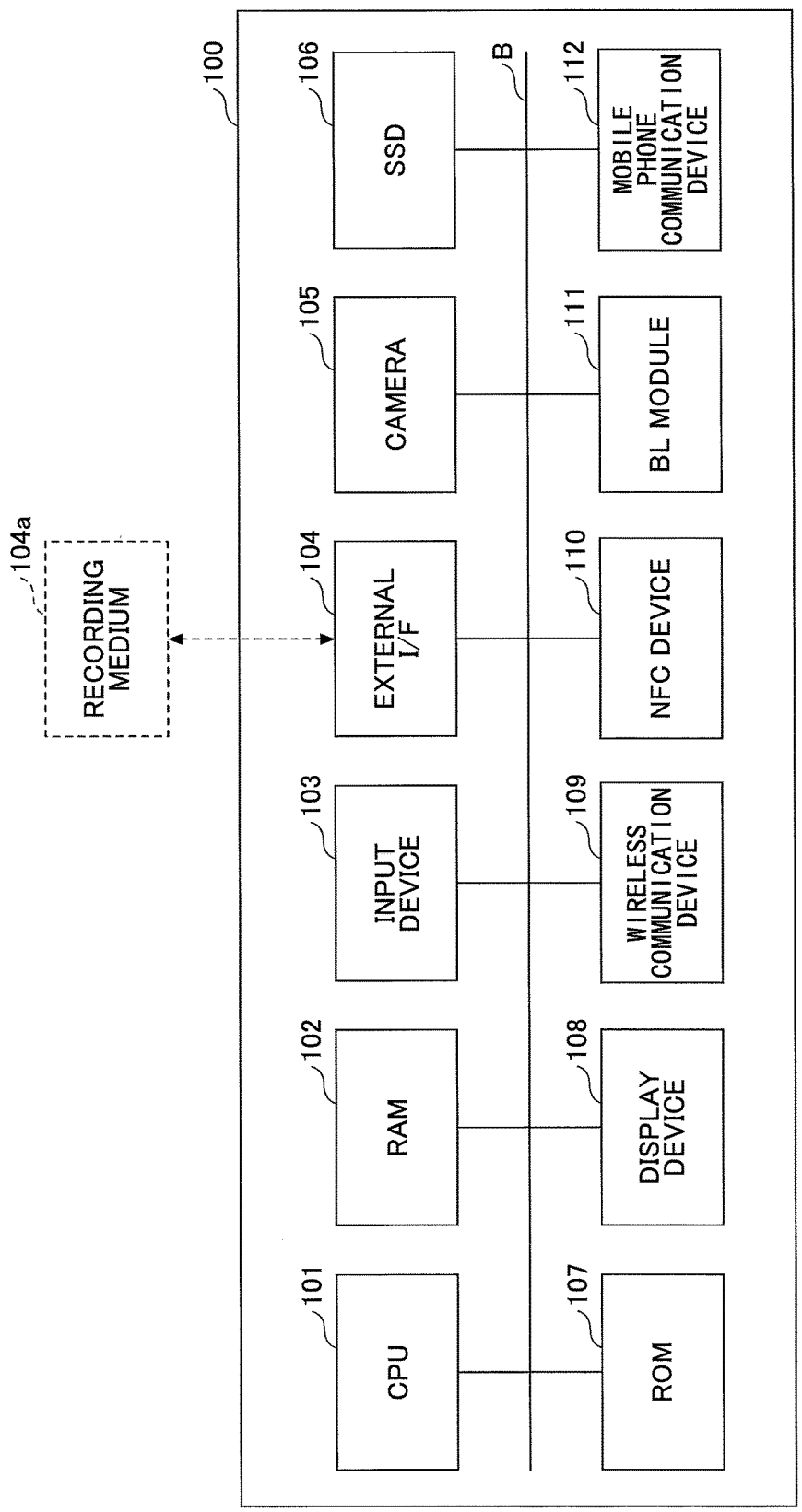
FIG. 3 is an example of a hardware configuration diagram of a user terminal according to an embodiment of the present invention.

FIG. 3 is an example of a hardware configuration diagram of the user terminal 100. As illustrated, the user terminal 100 has functions of an information processing apparatus. The user terminal 100 includes a central processing unit (CPU) 101, a random access memory (RAM) 102, an input device 103, an external interface (I/F) 104, a camera 105, a solid state drive (SSD) 106, a read-only memory (ROM) 107, a display device 108, a wireless communication device 109, a near field communication (NFC) device 110, a Bluetooth (registered trademark) (BL) module 111, and a mobile phone communication device 112, etc., and these elements are connected to each other by a bus B.

The CPU 101 is an arithmetic device that loads programs and data from a storage device such as the ROM 107 and the SSD 106, into the RAM 102, and executes processes to control the entire user terminal 100 and realize functions of the user terminal 100. The RAM 102 is a volatile semiconductor memory (storage device) that temporarily stores programs and data.

The input device 103 is, for example, a keyboard or a touch panel, and is used for inputting operation signals in the user terminal 100. Note that the input device 103 may include a mouse pointer and a voice sound input device.

The external I/F 104 is an interface between the user terminal 100 and an external device. An example of the external device is a recording medium 104a. The image processing application for realizing functions of the present embodiment can be stored in the recording medium 104a.

The user terminal 100 is able to read from and/or write in the recording medium 104a via the external I/F 104.

The recording medium 104a is a medium for storing information, such as a secure digital (SD) memory card. The recording medium 104a may also be a medium such as a USB memory, a digital versatile disk (DVD), a compact disk (CD), and a flexible disk.

The camera 105 is an imaging unit including imaging elements such as a lens, an aperture, a complementary metal-oxide semiconductor (CMOS), and a charge coupled device (CCD), for forming images. The camera 105 can not only capture still images but also videos.

The SSD 106 is a non-volatile storage device storing programs and data. The stored programs and data include, for example, an operating system (OS) that is the basic software controlling the entire user terminal 100, and the image processing application for supplying various functions in the OS. Note that the user terminal 100 may include a hard disk drive (HDD), etc., instead of the SSD 106 or together with the SSD 106.

The ROM 107 is a non-volatile semiconductor memory (storage device) that can store programs and data even after the power is turned off. The ROM 107 stores programs and data such as a basic input/output system (BIOS) that is executed when the user terminal 100 is activated, OS settings, and network settings, etc.

The display device 108 is a flat panel display such as a liquid crystal display (LCD) and an organic electroluminescence (EL), etc., and displays processing results by the user terminal 100. The display device 108 preferably includes a touch panel.

The wireless communication device 109 is an interface for performing wireless communication, and communicates with the imaging device 300 by a communication standard such as wireless LAN, etc. Note that examples a communication standard of wireless LAN are wireless fidelity (Wi-Fi) Direct, ad-hoc mode, and infrastructure mode, etc.; however, communication may be performed according to any of these communication standards.

The NFC device 110 performs communication according to a communication standard using an integrated circuit (IC) chip such as NFC and Transfer Jet (registered trademark), etc. That is, the NFC device 110 is a reader/writer of a radio-frequency (RF) tag.

The BL module 111 is a communication device that performs communication according to a communication standard of Bluetooth (registered trademark). The mobile phone communication device 112 is a communication device that can perform long distance wireless communication such as long term evolution (LTE) and third-generation (3G) communication, etc., and can connect to a mobile phone network.

Figure 4:
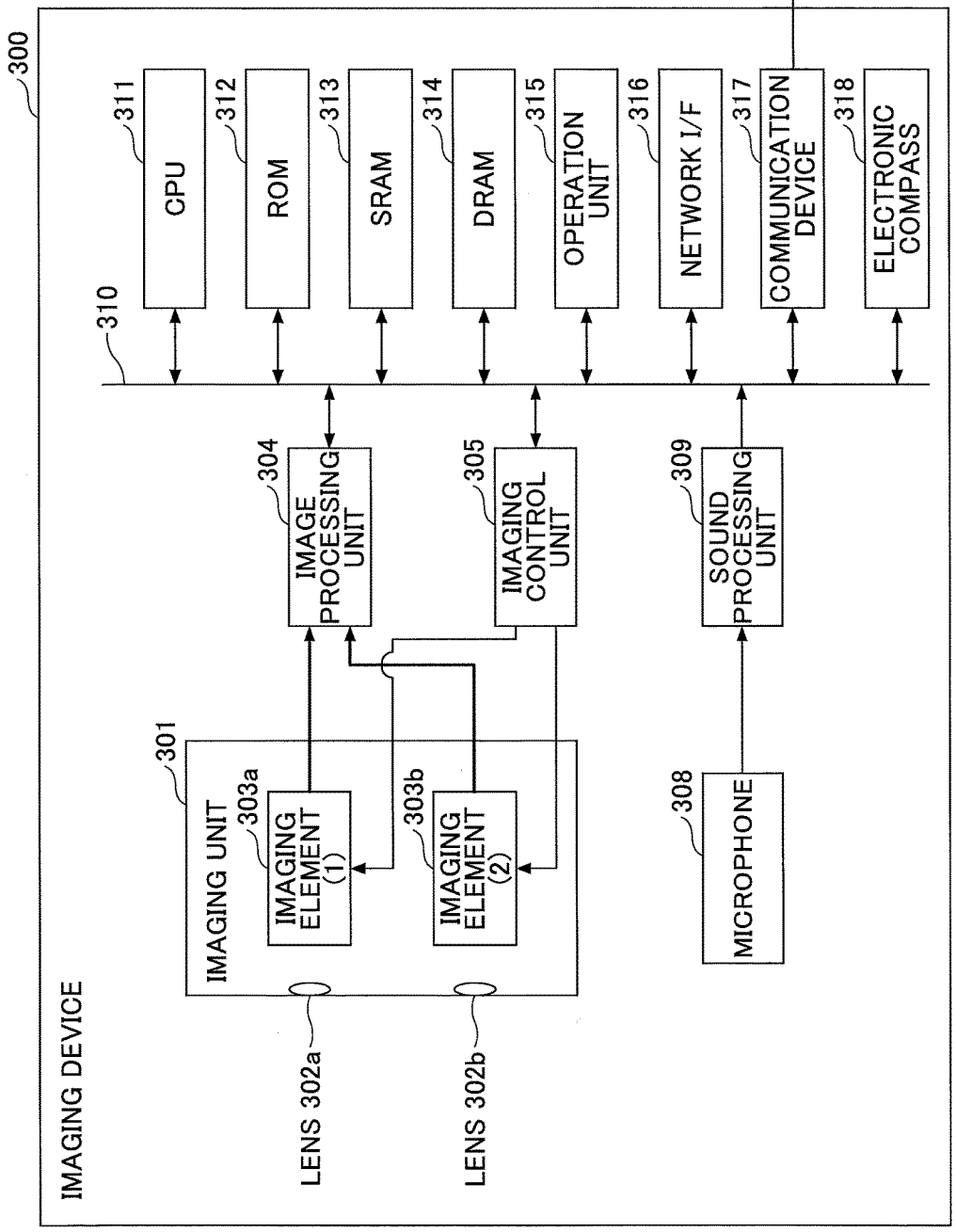
FIG. 4 is an example of a hardware configuration diagram of an imaging device according to an embodiment of the present invention.

FIG. 4 is an example of a hardware configuration diagram of the imaging device 300. In the following description, the imaging device 300 is an omnidirectional imaging device using two imaging elements; however, three or more imaging elements may be used. Furthermore, the imaging device 300 does not necessarily have to be a device that is exclusively used for omnidirectional imaging, but an omnidirectional imaging unit may be externally attached to a regular digital camera or a smartphone, etc., to achieve substantially the same functions as the functions of the imaging device 300.

As illustrated in FIG. 4, the imaging device 300 includes an imaging unit 301, an image processing unit 304, an imaging control unit 305, a microphone 308, a sound processing unit 309, a CPU 311, a ROM 312, a static RAM (SRAM) 313, a dynamic RAM (DRAM) 314, an operation unit 315, a network I/F 316, a communication device 317, an electronic compass 318, and an antenna 317a.

Among these elements, the imaging unit 301 includes wide angle lenses (so-called fish-eye lenses) 302a and 302b having an angle of view of greater than or equal to 180° for forming hemispheric images, and two imaging elements 303a and 303b arranged corresponding to the respective wide angle lenses. The imaging elements 303a and 303b include an image sensor such as a COMS sensor and a CCD sensor for converting optical images according to the fish-eye lenses into image data of electronic signals and outputting the image data, a timing generation circuit for generating horizontal or vertical synchronization signals and pixel clocks of the image sensor, and a group of registers in which various commands and parameters needed for the operations by the imaging elements are set, etc.

The imaging elements 303a and 303b of the imaging unit 301 are connected to the image processing unit 304 by a parallel I/F bus. On the other hand, the imaging elements 303a and 303b of the imaging unit 301 are connected to the imaging control unit 305 by a different serial I/F bus (Inter-Integrated Circuit (I2C) bus, etc.). The image processing unit 304 and the imaging control unit 305 are connected to the CPU 311 via a bus 310. Furthermore, the ROM 312, the SRAM 313, the DRAM 314, the operation unit 315, the network I/F 316, the communication device 317, and the electronic compass 318, etc., are also connected to the bus 310.

The image processing unit 304 takes in the image data output from the imaging elements 303a and 303b through the parallel I/F bus, performs a predetermined process on the respective image data items, performs a combination process on these image data items, and creates data by equidistant cylindrical projection.

The imaging control unit 305 generally acts as a master device with the imaging elements 303a and 303b acting as slave devices, and the imaging control unit 305 uses an I2C bus to set commands, etc., in the group of registers in the imaging elements 303a and 303b. The necessary commands, etc., are received from the CPU 311. Furthermore, the imaging control unit 305 similarly uses the I2C bus to take in the status data, etc., of the group of registers in the imaging elements 303a and 303b, and sends the status data to the CPU 311.

Furthermore, the imaging control unit 305 instructs the imaging elements 303a and 303b to output image data at the timing when the shutter button of the operation unit 315 is pressed. There may be cases where the imaging device 300 has a preview display function and a video display function by the display. In this case, the output of image data from the imaging elements 303a and 303b is continuously performed by a predetermined frame rate (frame/minutes).

Furthermore, the imaging control unit 305 also functions as a synchronization control unit for synchronizing the output timings of image data from the imaging elements 303a and 303b in cooperation with the CPU 311, as described below. Note that in the present embodiment, a display unit is not provided in the imaging device 300; however, a display unit may be provided in the imaging device 300.

The microphone 308 converts sound in to sound (signal) data. The sound processing unit 309 takes in the sound data output from the microphone 308 through an I/F bus, and performs a predetermined process on the sound data.

The CPU 311 controls operations of the entire imaging device 300 and executes necessary processes. The ROM 312 stores various programs for the CPU 311. The SRAM 313 and the DRAM 314 are work memories, and stores programs to be executed by the CPU 311 and data that are being processed, etc. Particularly, the DRAM 314 stores image data being processed by the image processing unit 304 and data of an image created by equidistant cylindrical projection that has been processed.

The operation unit 315 is a generic term for various operation buttons, a power switch, a shutter button, and a touch panel having both a display function and an operation function. The user operates the operation buttons to input various imaging modes and imaging conditions, etc.

The network I/F 316 is a generic term of an interface circuit (USB I/F, etc.) with respect to an external medium such as an SD card and a personal computer. Furthermore, the network I/F 316 may be a wired or wireless network interface. The data of an image created by equidistant cylindrical projection stored in the DRAM 314 is recorded in an external medium via the network I/F 316 or sent to an external device via the network I/F 316 acting as a network I/F according to need.

The communication device 317 performs communication with an external device by long distance wireless technology such as Wi-Fi, NFC, or LTE, etc., via the antenna 317a provided in the imaging device 300. The communication device 317 is also able to send the data of the image created by equidistant cylindrical projection to an external device.

The electronic compass 318 calculates the orientation and the tilt (Roll rotation angle) of the imaging device 300 from the magnetism of the earth, and outputs orientation/tilt information. This orientation/tilt information is an example of related information (metadata) in line with Exif, and is used for imaging processing such as image correction, etc., on a captured image. Note that the related information also includes various kinds of data such as the time and date when the image is captured and the data volume of the image data.

<Functions of User Terminal 100>

Figure 5:
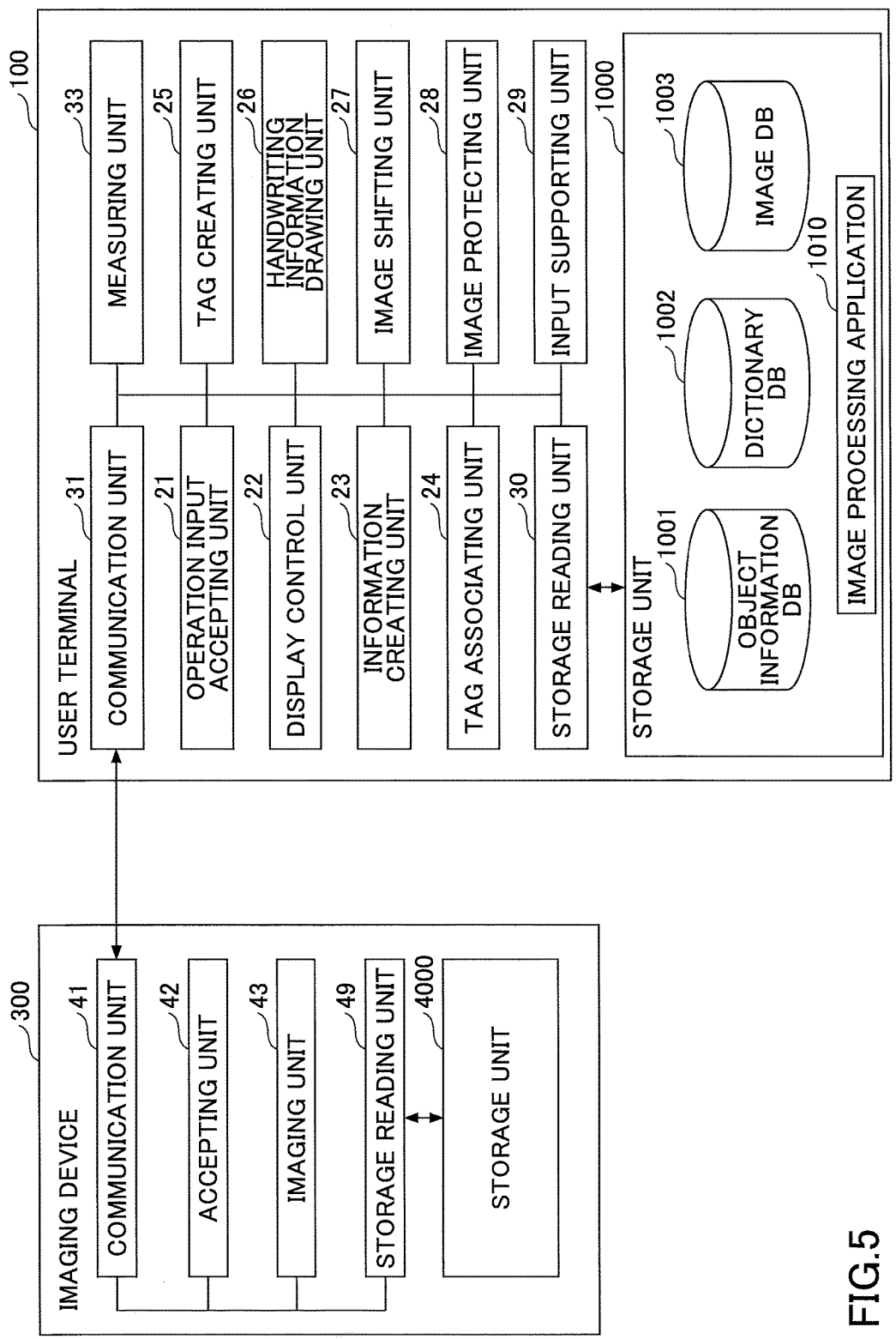
FIG. 5 is an example of a functional block diagram schematically indicating functions of the user terminal according to an embodiment of the present invention.

FIG. 5 is an example of a functional block diagram schematically indicating functions of the user terminal 100. The user terminal 100 includes an operation input accepting unit 21, a display control unit 22, an information creating unit 23, a tag associating unit 24, a tag creating unit 25, a handwriting information drawing unit 26, an image shifting unit 27, an image protecting unit 28, an input supporting unit 29, a measuring unit 33, and a storage reading unit 30. These functional units are functions or means that are realized as the CPU 101 executes the image processing application stored in the SSD 106 to control one of the elements illustrated in FIG. 3. Note that part of or all of these functional units may be realized by hardware (an integrated circuit (IC), etc.).

Furthermore, the user terminal 100 includes a storage unit 1000 constructed by the RAM 102, the SSD 106, and the ROM 107, etc., illustrated in FIG. 3. The storage unit 1000 stores an object information database (DB) 1001, a dictionary DB 1002, an image DB 1003, and an image processing application 1010. The image processing application 1010 is distributed in a state of being stored in the recording medium 104a or delivered from a server for delivering programs.

A description is given of the object information DB 1001, the dictionary DB 1002, and the image DB 1003.

TABLE 1

| DISTRIBUTION ID | Index | Item | Room | Detail | Volume Number | Note |
|---|---|---|---|---|---|---|
| 001 | PACKAGE | CLOTHING | BEDROOM | M × 4 | 16 | AIRMAIL |
| 002 | STRUCTURAL OBJECT | DINING TABLE | DINING ROOM | 133 × 83 × 11 (LEG 1) | 5 | SEA MAIL |
| 003 | STRUCTURAL OBJECT | REFRIGERATOR | KITCHEN |  | 7 | DOMESTIC MOVING |
| 004 | STRUCTURAL OBJECT | SOFA | LIVING ROOM |  | 8 | DOMESTIC STORAGE |
| 005 | PACKAGE | CLOTHING | STORAGE ROOM | S × 2 | 3 | SEA MAIL |
| 006 | STRUCTURAL OBJECT | CUPBOARD | KITCHEN |  | 7 | SEA MAIL |

Table 1 schematically indicates information to be registered in the object information DB 1001. The object information DB 1001 includes the fields of "Distribution ID", "Index", "Item", "Room", "Detail", "Volume Number", and "Note". The respective fields are described below. When these fields are not distinguished, the information registered in the object information DB 1001 is referred to as "object information".

Distribution ID: Identification information or an identifier that is not duplicate for uniquely identifying a conveyance object. Identification information or an identifier is a name, a symbol, a character string, a value, or a combination of these two elements, used for uniquely distinguishing a particular target from among a plurality of targets, and is hereinafter collectively referred to as "identification information". This information may also be referred to as conveyance object unique information, because this information identifies a conveyance object. A distribution ID that is not duplicate is applied to a conveyance object that is handled as a single conveyance object at the time of conveyance.

Index: Either a package or a structural object is set. A package is an object that can be put in a cardboard box, such as clothing and small articles. A structural object is an object that can be conveyed as is, such as a locker and a cupboard. Conveyance objects include packages and structural objects.

Room: Information for identifying the space in which the conveyance object is placed. Specifically, the information is a name of a room or a number of a room.

Detail: Mainly indicates the size. Other remarks relevant to the conveyance object may be input. For example, "M×4" means that four medium size (M size) cardboard boxes will be used. "133×83×11" indicates the sizes of length×width×depth.

Volume Number: The volume that the conveyance object occupies at the time of conveyance is indicated by a value of approximately 1 through 20. The higher the value, the larger the volume.

Note: Indicates the type of distribution. The means by which the conveyance object is conveyed is set, such as "airmail", "sea mail", "domestic moving", and "domestic storage", etc. Note that the image processing application may implement control such as changing the color of the tag 51, according to this classification.

Furthermore, the unit price of moving for each conveyance object is determined according to the combination of the volume number, the note, and the moving distance. Therefore, it is possible to create an approximate estimation if the information of the moving source and the moving destination is input in the image processing application.

TABLE 2

| C | CHEST |
|   | CLOTHING |
|   | CUPBOARD |
| . | . |
| . | . |
| . | . |
| D | DESK |
|   | DINING TABLE |
| . | . |
| . | . |
| . | . |
| R | REFRIGERATOR |
| S | SOFA |
| . | . |
| . | . |
| . | . |

Table 2 schematically indicates information registered in the dictionary DB 1002. The dictionary DB 1002 is a so-called dictionary in which words are registered in alphabetical order. The image processing application searches the dictionary DB 1002 for the same letter as the first letter input by the user, and displays words starting with the first letter. As the user inputs more letters, the words are narrowed down, and therefore the user selects and inputs a word by inputting a minimum number of letters. Note that it is effective to prepare a dictionary in which many words used in moving are registered, as the dictionary DB 1002.

TABLE 3

| IMAGE ID | FILE NAME | TAG INFORMATION | HANDWRITING INFORMATION |
| --- | --- | --- | --- |
| 001 | 20151012132532.jpg | (DISTRIBUTION ID, COORDINATES) | HANDWRITING ID: 01 HANDWRITING ID: 02 |
| 002 | 20151012132745.jpg | (DISTRIBUTION ID, COORDINATES) | HANDWRITING ID: 03 |

Table 3 schematically indicates the information registered in the image DB 1003. The image DB 1003 includes the fields of "image ID", "file name", "tag information", and "handwriting information", and stores image data. The image data that the user captures with the imaging device 300 is registered in the image DB 1003 by the image processing application, automatically or by an import operation by the user with respect to the image processing application. The image processing application applies an image ID that is not duplicate to the image data. The image ID is identification information for the image processing application to uniquely identify the image data, and the user does not need to know the image ID. The file name is the imaging time and date that the imaging device 300 has automatically applied, or any file name applied by the user. The tag information is information relevant to the tag 51 applied to the image data, and a pair of the distribution ID and coordinates corresponds to one tag information item. When the tag 51 is applied to the image data, the tag 51 is displayed at a position in the image data specified by the user as described with reference to FIG. 1. The position of the tag 51 is identified by coordinates using the origin of the image data (for example, the top left corner) as the reference. For example, the tag 51 is a rectangular frame, and therefore the coordinates (at least the top left corner and the top right corner) of the frame of the tag 51 are registered. Details of the handwriting information are described below; the coordinates of the stroke handwritten by the user in the image data is registered for each handwriting information. The handwriting information is identified by a "handwriting ID". The handwriting ID is identification information for uniquely identifying the handwriting information, and is not duplicated at least in the same image data. The handwriting ID is associated with a stroke forming the handwriting information, and a stroke is associated with coordinates forming the stroke; however, details are omitted.

<Functions of User Terminal 100>

The operation input accepting unit 21 is realized by the CPU 101 and the input device 103, etc., illustrated in FIG. 3, and the operation input accepting unit 21 accepts input of various operations or operations by the user with respect to the user terminal 100 and the image processing application.

The display control unit 22 is realized by the CPU 101, etc., illustrated in FIG. 3, and the display control unit 22 displays a screen of the image processing application on the display device 108. The screen (user interface) of the image processing application is described below with reference to FIG. 6, etc.; however, the input or operations with respect to the image processing application are accepted by the operation input accepting unit 21, and the display control unit 22 applies the input or the operation by the user to the screen.

The information creating unit 23 is realized by the CPU 101, etc., illustrated in FIG. 3, and the information creating unit 23 registers, in the object information DB 1001, the object information relevant to the conveyance object input to and accepted by the operation input accepting unit 21.

The tag associating unit 24 is realized by the CPU 101, etc., illustrated in FIG. 3, and the tag associating unit 24 connects tags by the line 52 when the tag 51 of the same distribution ID is applied to a plurality of image data items.

The tag creating unit 25 is realized by the CPU 101, etc., illustrated in FIG. 3, and the tag creating unit 25 receives an operation to create the tag 51 (pressing a creation button 504 described below) input to and accepted by the operation input accepting unit 21, and displays the tag 51 at a position in the image data specified by the user. Furthermore, the tag creating unit 25 registers tag information of the tag 51 in the image DB 1003. The position of the tag 51 is the position in the image data specified by the user.

The handwriting information drawing unit 26 is realized by the CPU 101, etc., illustrated in FIG. 3, and the handwriting information drawing unit 26 acquires coordinates of handwriting information with respect to image data input to and accepted by the operation input accepting unit 21, and registers the coordinates in association with the image ID in the image DB 1003. Furthermore, the handwriting information drawing unit 26 reads the handwriting information from the image DB 1003, and displays the handwriting information by superimposing the handwriting information on the image data. The coordinates of the handwriting information (stroke) are based on the same origin as the origin of the image data as the reference, and the handwriting information is displayed by being superimposed on an object in the image data.

The image shifting unit 27 is realized by the CPU 101, etc., illustrated in FIG. 3, and the image shifting unit 27 moves the image from the right edge to the left edge or from the left edge to the right edge in the image data, according to a shift operation by the user with respect to the image data accepted by the operation input accepting unit 21.

The image protecting unit 28 is realized by the CPU 101, etc., illustrated in FIG. 3, and the image protecting unit 28 releases the image protection with respect to the image data. Details are described below. Accordingly, even when an object or a person's face that is highly confidential is shown in the image data, the image data can be easily handled.

The input supporting unit 29 is realized by the CPU 101, etc., illustrated in FIG. 3, and the input supporting unit 29 performs an optical character recognition (OCR) process on the letter handwritten by the user, and displays a word read from the dictionary DB 1002 on the display device 108. Furthermore, when the user selects a displayed word, the input supporting unit 29 causes the tag creating unit 25 to create the tag 51 and to register the tag 51 in the image DB 1003, and causes the information creating unit 23 to register the object information in the object information DB 1001.

The measuring unit 33 is realized by the CPU 101, etc., illustrated in FIG. 3, and the measuring unit 33 uses the size of a measurement providing object described below to calculate the size of the object and perform a rough measurement.

The storage reading unit 30 is realized by the CPU 101, etc., illustrated in FIG. 3, and the storage reading unit 30 reads various kinds of data stored in the storage unit 1000 and writes various kinds of data in the storage unit 1000. Note that in the following description, even when the storage reading unit 30 reads and writes data with respect to the storage unit 1000, a description of "via the storage reading unit 30" may be omitted.

<Functional Configuration of Imaging Device 300>

The imaging device 300 includes a communication unit 41, an accepting unit 42, an imaging unit 43, and a storage reading unit 49. These elements are functions or means that are realized as any of the elements illustrated in FIG. 4 operates by instructions from the CPU 311 according to a program for an imaging device, etc., loaded into the DRAM 314 from the SRAM 313.

Furthermore, the imaging device 300 includes a storage unit 4000 that is constructed by one or more of the ROM 312, the SRAM 313, and the DRAM 314 illustrated in FIG. 4. The storage unit 4000 stores a program for the imaging device.

The communication unit 41 is mainly realized by processes by the communication device 317, the network I/F 316, and the CPU 311 illustrated in FIG. 4, and the communication unit 41 performs data communication with the user terminal 100.

The accepting unit 42 is mainly realized by processes by the operation unit 315 and the CPU 311 illustrated in FIG. 4, and the accepting unit 42 accepts operation input from the user.

The imaging unit 43 is mainly realized by processes by the imaging unit 301, the image processing unit 304, the imaging control unit 305, and the CPU 311 illustrated in FIG. 4, and captures images of the scenery, etc., and creates image data.

The storage reading unit 49 is mainly realized by processes by the CPU 311 illustrated in FIG. 4, and the storage reading unit 49 reads stores various kinds of data in the storage unit 4000 and reads various kinds of data from the storage unit 4000.

<User Interface>

Figure 6:
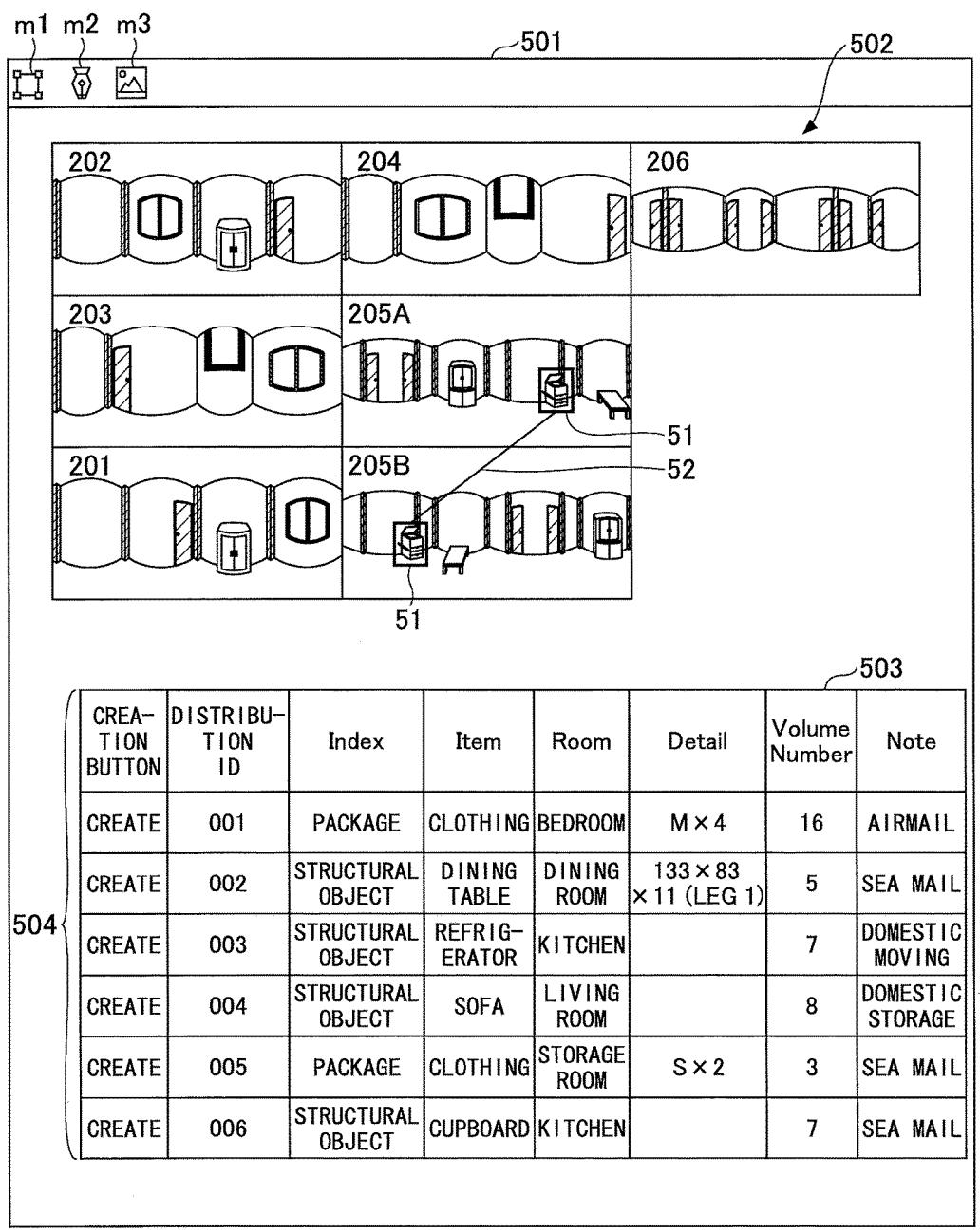
FIG. 6 is a diagram illustrating an example of a user interface of an image processing application according to an embodiment of the present invention.

Referring to FIG. 6, a description is given of a user interface of the image processing application. FIG. 6 is a diagram illustrating an example of a user interface of the image processing application. The image processing application mainly includes a menu field 501, an image display field 502, and an information display field 503. In the menu field 501, a menu that is frequently used is displayed.

A menu m1 is a menu for the user to select handwriting information that is already drawn. When the user selects the menu m1 and performs an operation of surrounding handwriting information with the user's finger or a pointing device such as a mouse, the handwriting information is selected.

A menu m2 is a menu for the user to write in new handwriting information by handwriting. When the user selects the menu m2 and selects a color and a thickness, and writes in handwriting information (stroke) in the image data by the user's finger or a pointing device such as a mouse, the handwriting information is drawn in the image data.

A menu m3 is a menu for the user to switch between single display by which one of a plurality of image data items is displayed at a time in the image display field 502, and list display by which a plurality of image data items are displayed side by side (FIG. 6 illustrates a state of list display). When the user selects the menu m3, one image data item is displayed in an enlarged state in the image display field 502, and when the user selects the menu m3 again, a plurality of image data items are displayed in the form of list display as illustrated in FIG. 6. Note that the image processing application has many other functions; however, descriptions of other functions are omitted as a matter of convenience.

In the image display field 502, the image data stored in the image DB 1003 is displayed. In the case of list display, the respective image data items are displayed in the form of a list. The user selects and drags the image data to move the position of the image data or rearrange the positions of the image data. This function is executed by the operation input accepting unit 21 and the display control unit 22.

The information display field 503 is an editor used by the user for registering object information in the object information DB 1001. The user uses the information display field 503 to register any information in each field indicated in table 1. Note that the distribution ID is automatically applied by the information creating unit 23. Furthermore, in the information display field 503, the creation button 504 is displayed in addition to the object information registered in the object information DB 1001.

The creation button 504 is a button used by the user for applying the tag 51 to the image data. When the operation input accepting unit 21 accepts that the creation button 504 has been pressed, the tag creating unit 25 acquires a distribution ID of the record operated by the user, from the operation input accepting unit 21. Next, when the user taps (clicks) the image data with the user's finger of a pointing device such as a mouse, the tag creating unit 25 displays the tag 51 at the tapped position. Accordingly, the object associated with the distribution ID in the object information DB 1001 can be displayed together with the tag 51.

Note that the display control unit 22 is able to display only one of the image display field 502 and the information display field 503 in an enlarged state, or may not display either the image display field 502 or the information display field 503.

<Usage Method of Image Processing Application>

Figure 7:
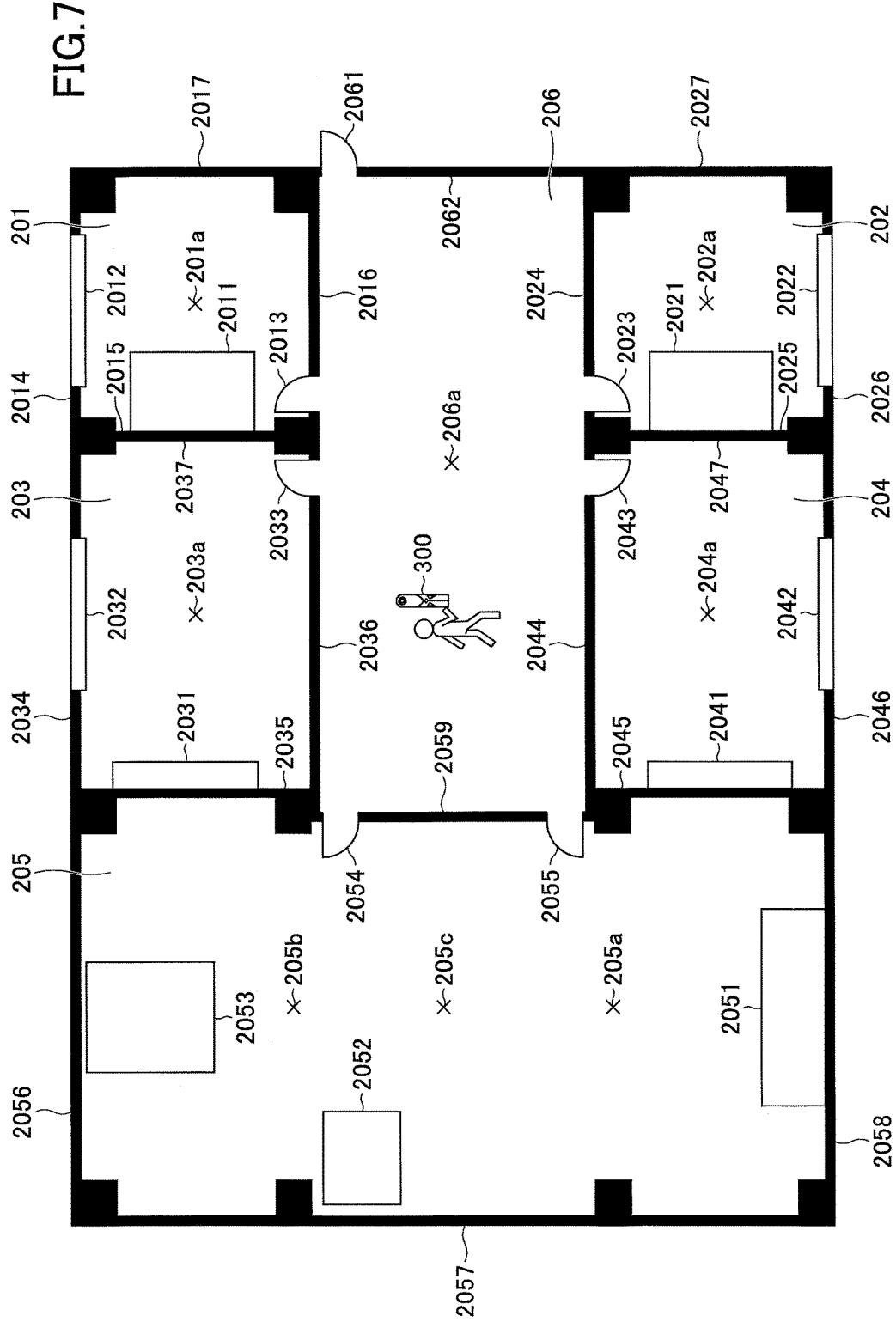
FIG. 7 illustrates an example of a plan view of the floor of a moving source according to an embodiment of the present invention.

In the following, a description is given of a usage method of the image processing application. FIG. 7 illustrates an example of a plan view of the floor of the moving source. The floor of the moving source includes five rooms 201 through 205 and one hallway 206. The room 201 includes a locker 2011, a window 2012, and a door 2013. The room 202 includes a locker 2021, a window 2022, and a door 2023. The room 203 includes a screen 2031 on which a projector projects an image, a window 2032, and a door 2033. The room 204 includes screen 2041 on which a projector projects an image, a window 2042, and a door 2043. The room 205 includes a desk 2053, a copier 2052, a bookshelf 2051, and doors 2054 and 2055.

The user uses the imaging device 300 to capture images of the surrounding, at the illustrated imaging spots 201a through 206a in the respective rooms 201 through 205 and the hallway 206. Note that the imaging spots 201a through 206a are examples; images do not need to be captured at these imaging spots 201a through 206a.

<Image Protection>

First, a description is given of the projection of the captured image data. There may be cases where the user makes estimations or exchanges information for confirming positions, based on an image including a subject (for example, an object on which personal information such as a name is printed or described) that is shown in the image but the user does not want to display the subject, or an image including a subject is not supposed to be displayed. Assuming such cases, the image processing application includes a function for protecting image data. Accordingly, the security can be improved.

In a state where the image processing application has taken in image data, all of the image data items that have been taken in are protected in entirety. A protected image is in a state where the image has undergone a process of reducing the visibility (visibility reduction process). An image is protected by performing, for example, a mosaic process, a smoothing process, or a contract reducing process, etc.; however, the image may be protected by any kind of process.

When the image processing application takes in image data, the user is able to input an instruction of whether to release the image protection, for each image data item. In a state where the entire image is protected, the user cannot see the conveyance object, and therefore the user can release the image protection only for the part that is needed for the moving task. The part that is needed for the moving task is mainly the part where the conveyance object and the door, etc., are shown.

FIGS. 8A through 8C are examples of diagrams for describing the release of image protection. FIG. 8A illustrates an image that is protected displayed in the image display field 502. A protected image is displayed together with a message 601 reading "in protected state".

The user who is going to release the image protection traces the part where image protection is to be released, with the user's finger or a pointing device 603 such as a mouse. The operation input accepting unit 21 accepts the coordinates of the part traced by the user, and the image protecting unit 28 releases the image protection of the part traced by the user.

Specifically, the image protecting unit 28 uses the image data that is not protected to release the protection. FIG. 8B illustrates image data that is not protected. The image data in FIG. 8B is temporarily stored in the RAM 102 without being displayed in the image display field 502. The image protecting unit 28 acquires the coordinates of the part traced by the user from the image data of FIG. 8B, and replaces the corresponding part in the image of FIG. 8A with the acquired part. Accordingly, the protection is released for only the part that is traced by the user, and the user is able to see the necessary conveyance object.

FIG. 8C illustrates the image data in which the protection of a partial area in the image data is released. The image data indicates that the image protection is released at the parts of the bookshelf 2051, the copier 2052, and the desk 2053, together with a message 602 reading "will store in this state". The mover stores this image data, for example, while the person in charge at the moving source is present. When the image data is stored, the image protecting unit 28 deletes the image data of FIG. 8B from the RAM 102.

Therefore, from the viewpoint of the person in charge of the moving source, it is possible to prevent a situation where the image data is taken outside in a state where an object that is highly confidential and a person's face, etc., are shown in the image data. This is particularly effective in the case of image data having a wide angle of view captured by the imaging device 300.

FIG. 9 is an example of a flowchart indicating procedures of releasing the protection of image data by the image processing application. The process of FIG. 9 starts, for example, when a user causes the image processing application to take in image data.

First, the image processing application takes in image data (step S10). The image protecting unit 28 creates a copy of the image data acquired from the imaging device 300, etc., and performs a process of image protection such as a mosaic process and a smoothing process, etc., on the entirety of one of the two image data items. The display control unit 22 only displays the image data for which the image has been protected, in the image display field 502.

Next, the operation input accepting unit 21 determines whether the user has performed an operation of releasing the image protection (step S20). When the determination of step S20 is NO, the image data is stored in the image DB 1003 in the state of being protected.

When the determination of step S20 is YES, the operation input accepting unit 21 reports the release of image protection to the image protecting unit 28.

The image protecting unit 28 acquires the coordinates of the part to be released according to the user's operation, via the operation input accepting unit 21 (step S30).

The image protecting unit 28 acquires the image of the coordinates of the part to be released, from image data that is not subjected to image protection, and replaces the part of the image in the image data subjected to image protection with the acquired part (step S40).

During the processes of steps S30 and S40, the image protecting unit 28 determines, via the operation input accepting unit 21, whether the user has ended the operation of releasing the image protection (step S50). When the determination of step S50 is NO, the processes of steps S30 and S40 are continuously performed.

When the determination of step S50 is YES, the image protecting unit 28 stores the image data for which the image protection has been released, in the image DB 1003, and deletes the image data that is not subjected to image protection from the RAM 102 (step S60).

Note that the process of releasing image protection corresponds to a case where the process of image protection is irreversible. When the process of protecting an image and a process of releasing the image protection are reversible, the image protecting unit 28 can perform the process of releasing the image protection by inverse transformation.

Furthermore, the releasing of image protection may be executed at any timing, such as when the user has performed an operation, other than when the image processing application has taken in the image data.

<Arrangement of Image Data>

The image data (for which the protection is released or not released) is displayed in the image display field 502 as described above. In the following description, the image data for which the entire protection has been released is illustrated and described.

Figure 10A:
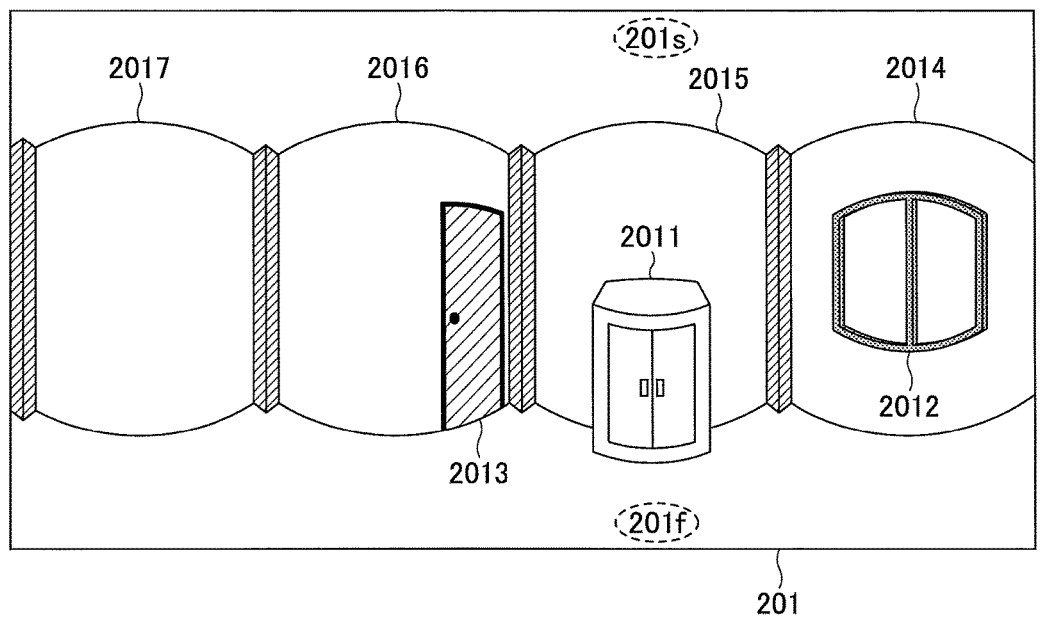
FIGS. 10A and 10B are examples of diagrams illustrating image data captured in rooms 201 and 202 according to an embodiment of the present invention.
Figure 11A:
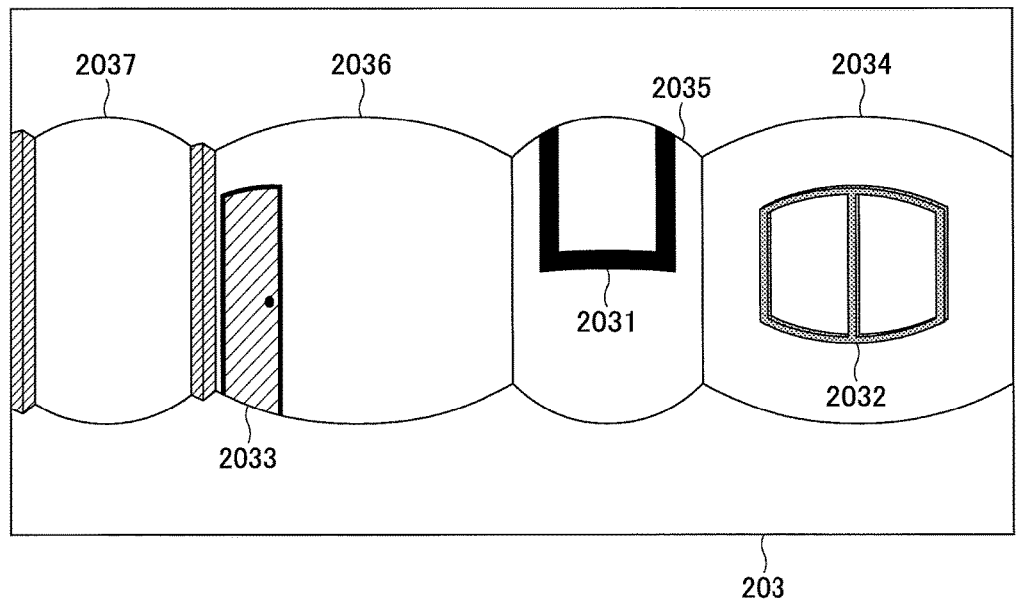
FIGS. 11A and 11B are examples of diagrams illustrating image data captured in rooms 203 and 204 according to an embodiment of the present invention.
Figure 11B:
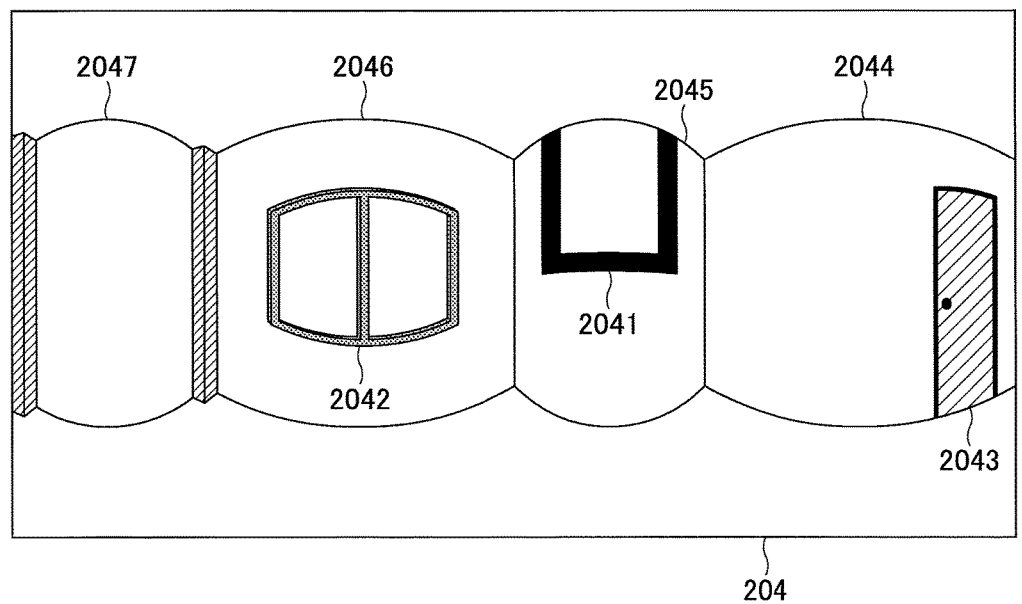
Figure 12A:
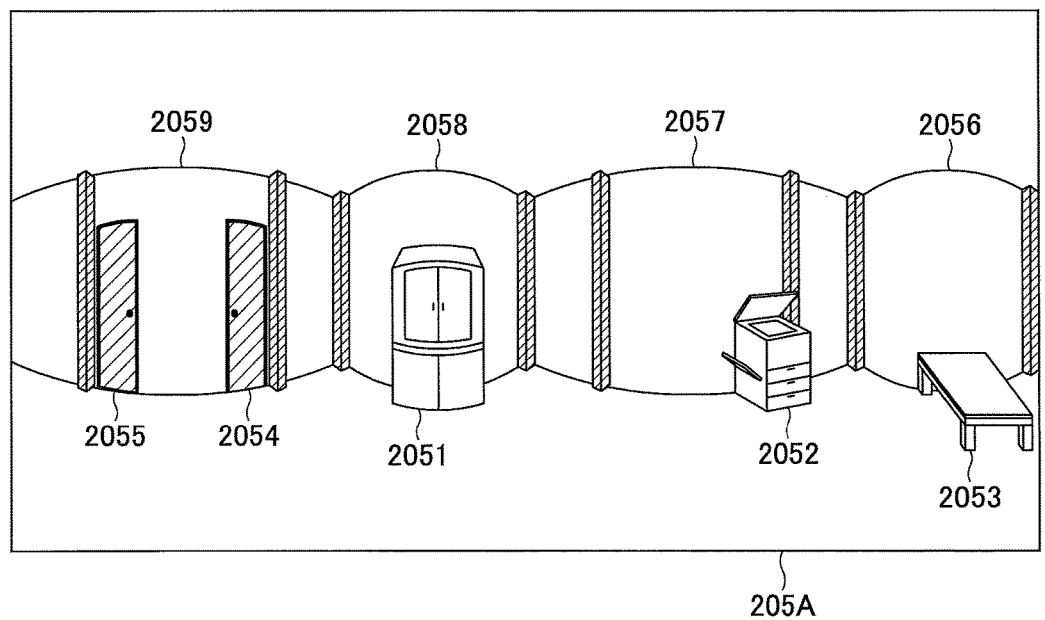
FIGS. 12A and 12B are examples of diagrams illustrating image data captured in a room 205 according to an embodiment of the present invention.
Figure 12B:
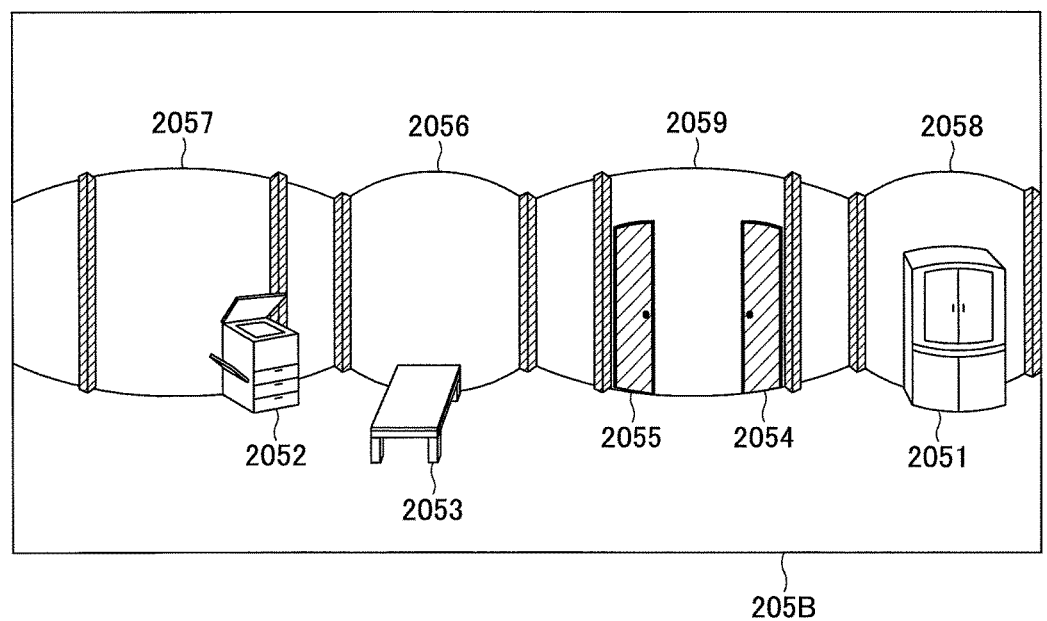
Figure 13:
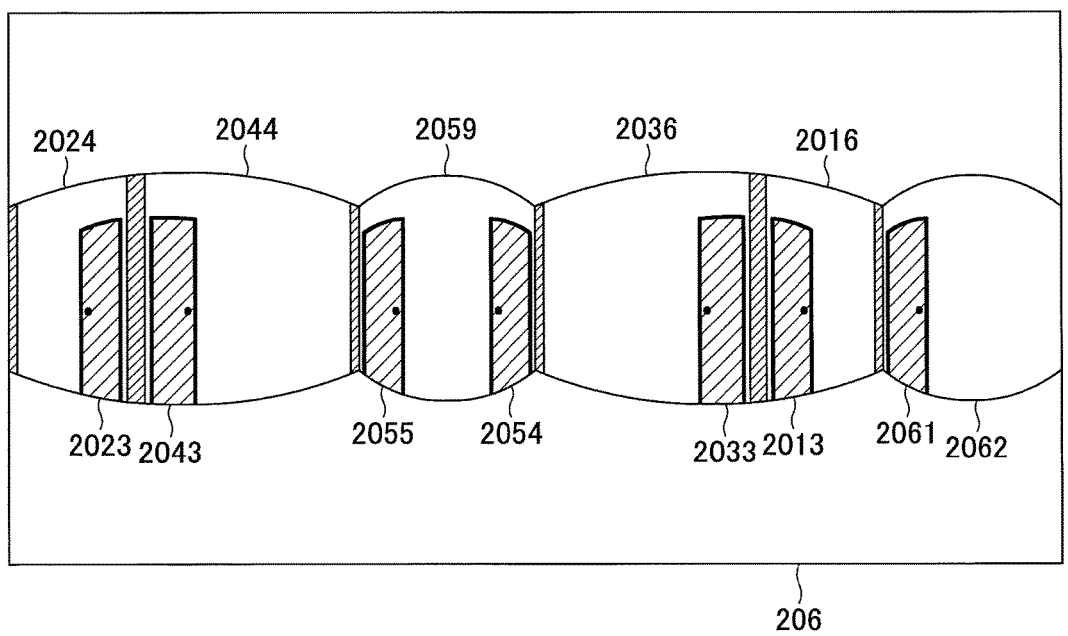
FIG. 13 is a diagram illustrating an example of image data captured in a hallway 206 according to an embodiment of the present invention.

FIGS. 10A through 13 are diagrams illustrating examples of image data displayed in the image display field 502. FIG. 10A illustrates the image data 201 captured in the room 201. FIG. 10B illustrates the image data 202 captured in the room 202. FIG. 11A illustrates the image data 203 captured in the room 203. FIG. 11B illustrates the image data 204 captured in the room 204. FIGS. 12A and 12B illustrate the image data 205A and the image data 205B captured in the room 205. FIG. 13 illustrates the image data 206 captured in the hallway 206.

The image data items 201 through 206 are omnidirectional images obtained by capturing 360 degrees of the surrounding, and therefore these image data items 201 through 206 are difficult to display two-dimensionally without distortion. In the present embodiment, the image data that has been deformed by equidistant cylindrical projection is indicated. Equidistant cylindrical projection is a method of directly converting the latitude and the longitude of an omnidirectional image into X coordinates and Y coordinates. The distortion close to the equator is small, but the distortion increases as the distance from the equator increases. Other than equidistant cylindrical projection, the image data may be created by a projection method prioritizing the visibility for the user, such as Mercator projection.

A description is given by taking FIG. 10A as an example. In FIG. 10A, the locker 2011, the window 2012, and the door 2013 are captured in the image. As can be seen by comparing with FIG. 7, four walls 2014 through 2017 of the room 201 are all shown in a single image data item of FIG. 10A, and all of the objects that can be captured in the room 201 are captured in the image data. Therefore, all of the directions of north, south, east, and west can be expressed in two-dimensional image data by equidistant cylindrical projection. In FIG. 10A, a ceiling 201s and a floor 201f are also shown; however, because the image is largely distorted by equidistant cylindrical projection, the objects such as the ceiling and the floor are appropriately omitted.

Figure 10B:
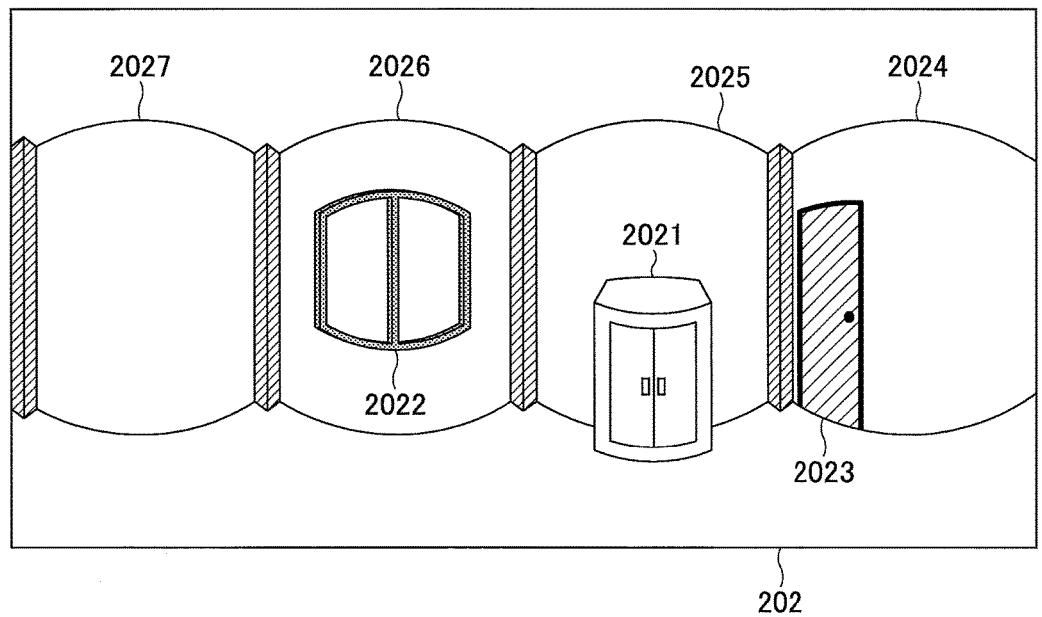

The same applies to FIGS. 10B through 313. In FIG. 10B, the locker 2021, the window 2022, the door 2023, and walls 2024 through 2027 are captured. In FIG. 11A, the screen 2031, the window 2032, the door 2033, and walls 2034 through 2037 are captured. In FIG. 11B, the screen 2041, the window 2042, the door 2043, and walls 2044 through 2047 are captured.

FIGS. 12A and 12B respectively indicate image data items captured twice in one room 205. FIG. 12A indicates the image data 205A captured at the imaging spot 205a, and FIG. 12B indicates the image data 205B captured at the imaging spot 205b. The image data items 201 through 206 are omnidirectional images, and therefore the same objects (the bookshelf 2051, the copier 2052, the desk 2053, and the doors 2054 and 2055) are captured in the image data 205A and the image data 205B. Furthermore, in FIG. 13 in which the hallway 206 is captured, doors 2061 through 2067 are captured.

The user is able to arrange these seven image data items 201 through 206 in the image display field 502, so as to be easily viewable. As described above, as a matter of convenience, the reference numeral of the image data of FIG. 10A is 201, the reference numeral of the image data of FIG. 10B is 202, the reference numeral of the image data of FIG. 11A is 203, the reference numeral of the image data of FIG. 11B is 204, the reference numeral of the image data of FIG. 12A is 205A, the reference numeral of the image data of FIG. 12B is 205B, and the reference numeral of the image data of FIG. 13 is 206.

Figure 14:
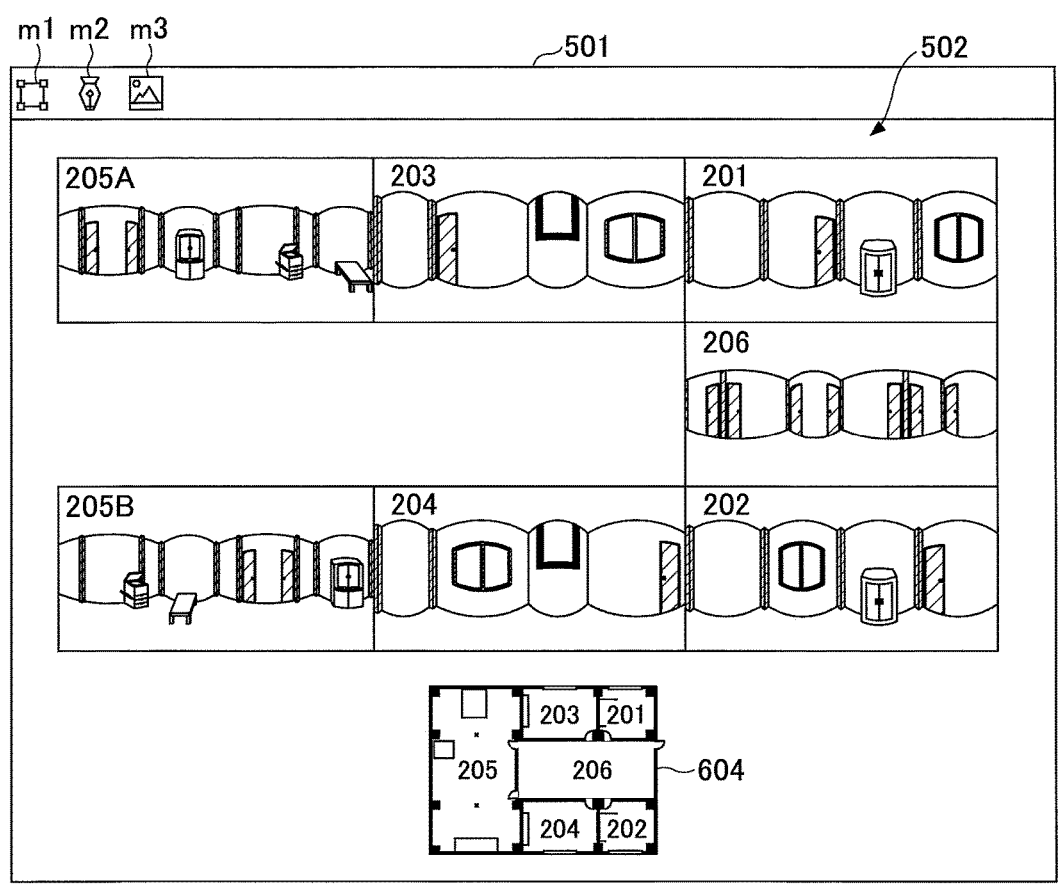
FIG. 14 is an example of a diagram illustrating the image data items displayed in an image display field according to an embodiment of the present invention.

FIG. 14 is an example of a diagram illustrating the image data items 201 through 206 displayed in the image display field 502. The image display field 502 in FIG. 14 is divided into cells (or a lattice), and one image data item is arranged in one cell. When the user moves the image data with the user's finger of a pointing device such as a mouse, the user can move the image data inside a cell by moving the image data near the center of the cell, and therefore the operability is high. The user can change the arrangement of the image data items 201 through 206 to be the same arrangement as the arrangement of a plan view 604 of the floor of the moving source.

In FIG. 14, as a result of being moved by the user, the arrangement of the image data items 201 through 206 is the same as the arrangement in the plan view 604 of the floor of the moving source. Note that in FIG. 14, the same plan view 604 as the plan view of FIG. 7 is displayed for the sake of the description; however, the plan view 604 is not necessarily displayed in the image processing application. In order to display the plan view 604, the user is to read the plan view 604 with a scanner, etc., and import (take in) the plan view 604 to the image processing application.

Note that there are blank cells in the image display field 502; however, there is no blank room in the plan view 604. That is, the arrangement of the image data items 201 through 206 does not completely match the plan view 604 of the floor of the moving source. The reason for this difference is that while the sizes (number of pixels) of the image data items 201 through 206 are fixed, the sizes of the rooms 201 through 205 and the hallway 206 are not fixed. In order to make the arrangement of the image data items 201 through 206 match the plan view 604 of the floor of the moving source, the user may enlarge or reduce the image data items 201 through 206.

Figure 15:
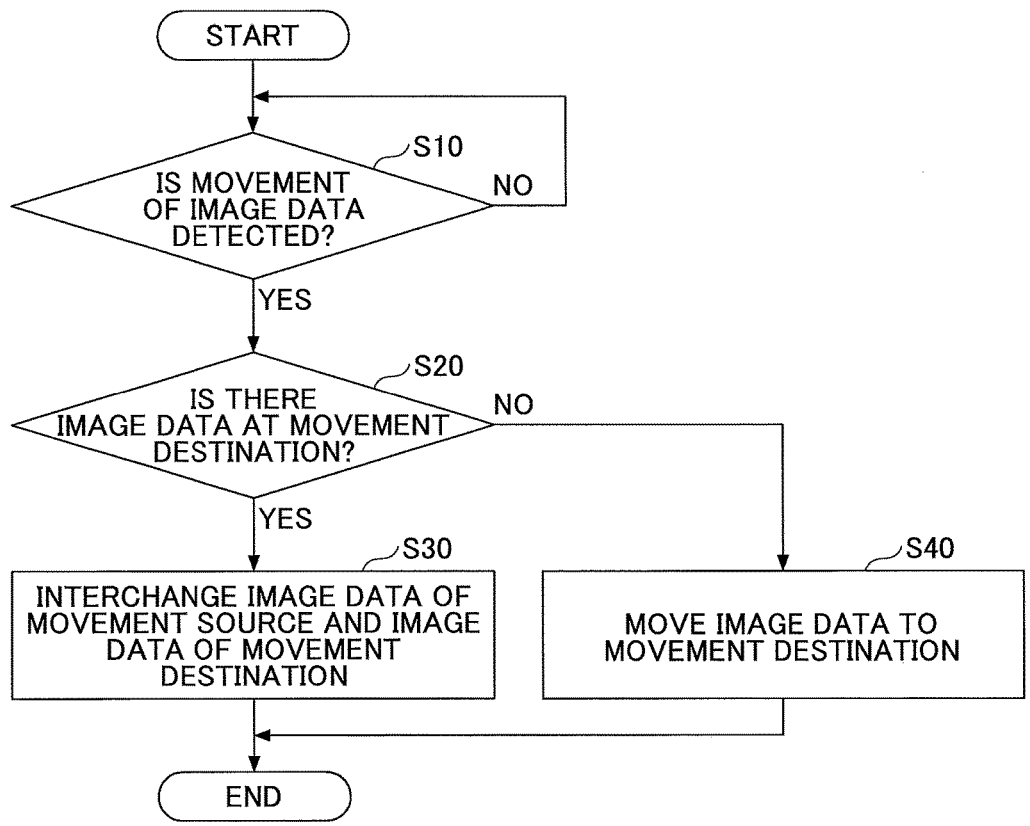
FIG. 15 is an example of a flowchart illustrating procedures of moving the image data in the image display field by the image processing application according to an embodiment of the present invention.

FIG. 15 is an example of a flowchart illustrating procedures of moving the image data in the image display field 502 by the image processing application. The process of FIG. 15 is repeatedly executed, for example, while the image display field 502 is in a state of list display.

The operation input accepting unit 21 determines whether the movement of the image data is detected (step S10). Specifically, the operation input accepting unit 21 determines whether the coordinates of a finger or the pointing device 603 such as a mouse is indicating any one of the image data items, and the coordinates of the pointing device 603 have moved from the cell of the movement source to another cell.

When the determination of step S10 is YES, the display control unit 22 determines whether there is image data at the movement destination (step S20). That is, the display control unit 22 acquires, from the operation input accepting unit 21, the cell (or coordinates) of the movement source and the cell (or coordinates) of after moving, and determines whether there is image data at the movement destination.

When the determination of step S20 is YES, the display control unit 22 interchanges the image data of the movement source and the image data at the movement destination (step S30).

When the determination of step S20 is NO, the display control unit 22 moves the image data to the movement destination (step S40). As described above, the user can change the arrangement of the image data items 201 through 206 to any arrangement.

Furthermore, the image display field 502 does not have to be divided into cells; but the user may move the image data to any position. In this case, the display control unit 22 acquires the trajectory of coordinates of the finger or the pointing device 603 such as a mouse from the operation input accepting unit 21, and moves the image data according to the coordinates. The user can determine a detailed position of the image data by the user's finger or the pointing device 603 such as a mouse.

<Shift of Image>

In the image data according to the equidistant cylindrical projection, the scenery of 360 degrees (north, south, west, and east) in the horizontal direction is captured. However, the orientation of north, south, west, and east and the horizontal position in which the image data is captured, depend on how the user is holding the imaging device 300 at the time of capturing the image. Therefore, unless the user captures images of all of the rooms 201 through 205 and the hallway 206 in the same direction, the relationship between the horizontal position and the orientation of north, south, west, and east may differ according to the image data.

Figure 16A:
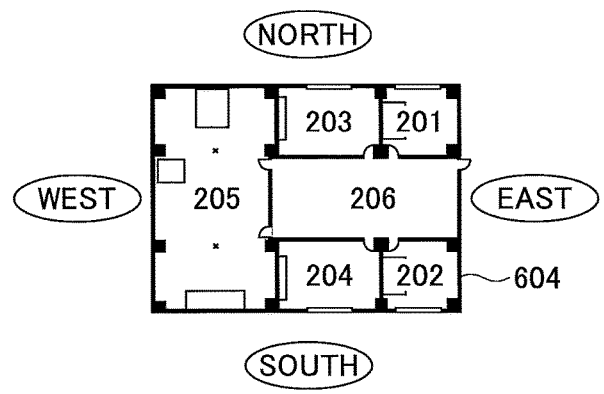
FIGS. 16A through 16C are examples of diagrams for describing the relationship between the orientation of north, south, west, and east and a plan view, and the relationship between the horizontal position and the orientation of north, south, west, and east in image data according to an embodiment of the present invention.
Figure 16B:
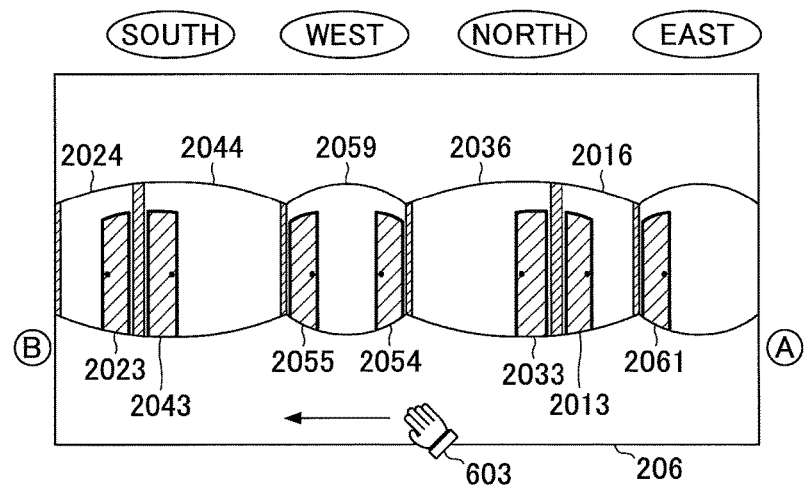
Figure 16C:
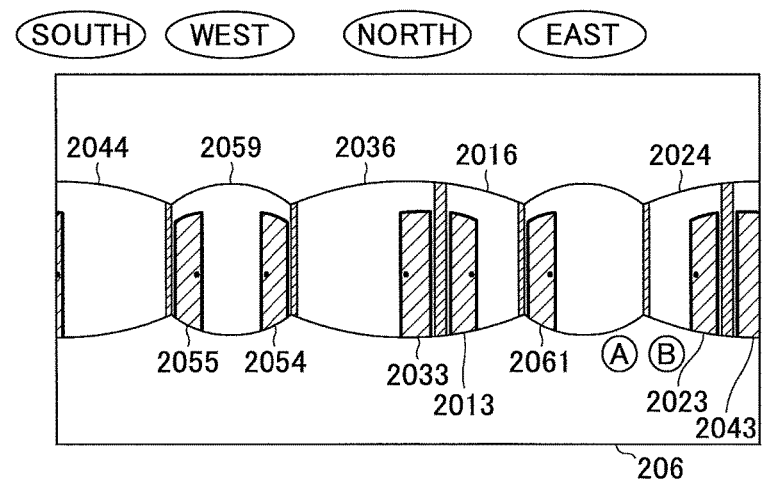

FIGS. 16A through 16C are examples of diagrams for describing the relationship between the orientation of north, south, west, and east and a plan view, and the relationship between the horizontal position and the orientation of north, south, west, and east in image data. FIG. 16A illustrates the relationship between the plan view 604 and north, south, west, and east, and FIG. 16B illustrates the relationship between the horizontal position and north, south, west, and east in the image data 206 of the hallway 206. When the user faces the north direction and makes a consideration, the user has the plan view 604 in mind, and therefore it would be convenient if the relationship between the horizontal position and north, south, west, and east is the same in a plurality of image data items.

In order to respond to such a demand, the image shifting unit 27 of the image processing application is able to shift the image data in the horizontal direction according to an operation by the user. The user operates a predetermined menu, and swipes the image data in the horizontal direction by the user's finger or the pointing device 603 such as a mouse. In the present embodiment, this swiping operation is referred to as a shift operation. The operation input accepting unit 21 accepts this operation and reports this operation to the image shifting unit 27. The image shifting unit 27 shifts the image by an amount corresponding to the shift operation.

Note that the user of the moving source is capturing images at the site of the moving source, and is therefore able to perceive the direction in which the objects shown in the image data items 201 through 206 are present, even if the user does not have the plan view 604.

FIG. 16C is a diagram illustrating image data that has been shifted. The part from the south to the east that is present at the left end in FIG. 16B is moved to the right end in FIG. 16C. In the image data, the scenery of north, south, west, and east in the horizontal direction is captured, and therefore the image shifting unit 27 is able to cut off the image at the end and add the cut off image to the other end according to the shift direction indicated by the user, to shift the image data.

According to the image data 206 of FIG. 16C, the scenery in the north direction is substantially at the center horizontal position. Also with respect to the other image data items 201 through 205, as the user similarly shifts the image data, the scenery in the north direction can be shifted to substantially the center horizontal position. Accordingly, it is easy to perceive the part of the plan view 604 that corresponds to the scenery in the horizontal direction in the image data. Therefore, even if similar scenarios are captured in a single image data item, the user can clearly distinguish the orientation of each scenery and manage the objects. Note that the shift process is possible both for single display and list display in the image display field 502.

Figure 17:
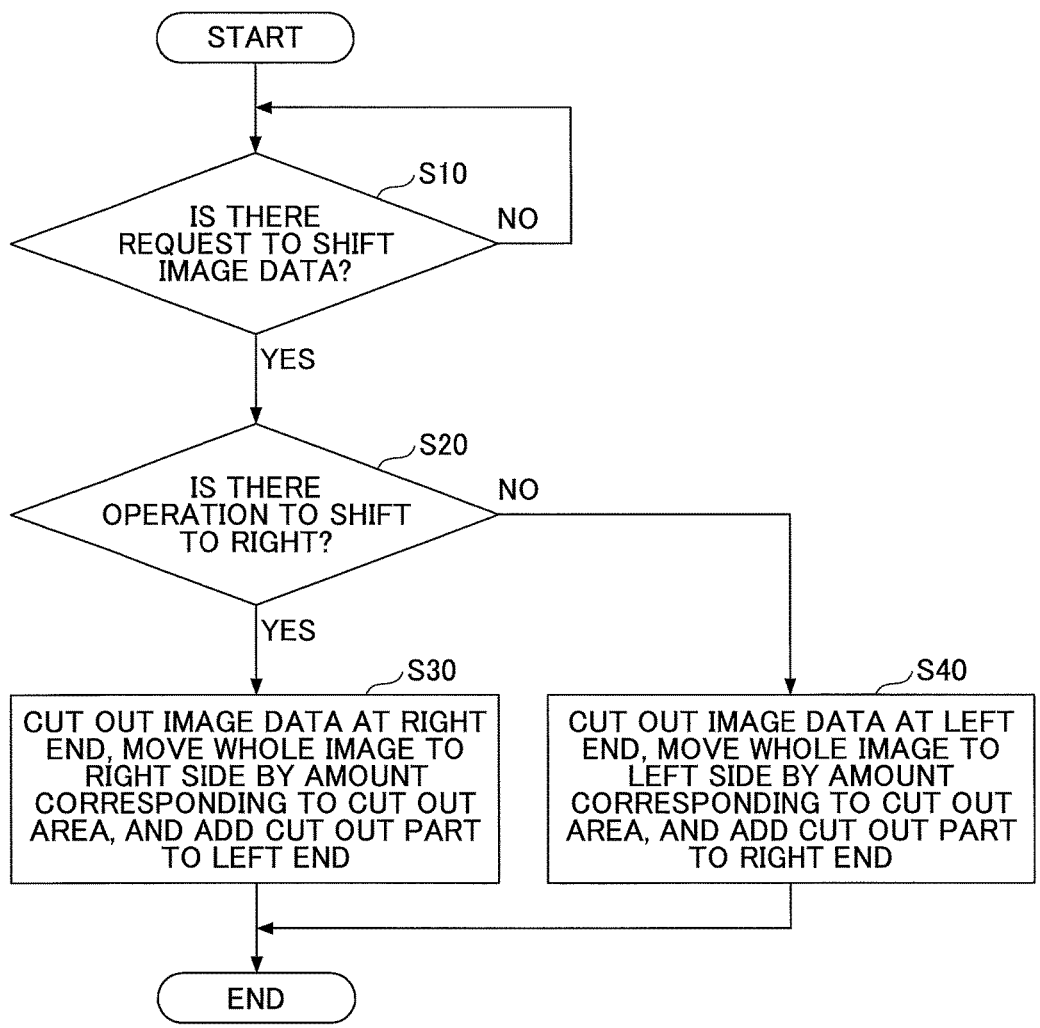
FIG. 17 is an example of a flowchart indicating procedures of shifting the image data by the image processing application according to an embodiment of the present invention.

FIG. 17 is an example of a flowchart indicating procedures of shifting the image data by the image processing application. The process of FIG. 17 is repeatedly executed, for example, while the image display field 502 is displayed.

The image shifting unit 27 determines whether there is a request to shift the image data from the user via the operation input accepting unit 21 (step S10). For example, when the user double-taps the image data or holds down the image data, the image shifting unit 27 may determine that there is a shift request; however, any kind of operation may be determined to be a shift request.

When the determination of step S10 is YES, the image shifting unit 27 determines whether there is a shift operation to the right (step S20). That is, the image shifting unit 27 determines whether a report is received from the operation input accepting unit 21 indicating that the coordinates of the user's finger or the pointing device 603 have moved to the right direction.

When the determination of step S20 is YES, the image shifting unit 27 acquires the movement amount to the right direction from the operation input accepting unit 21, cuts off the image data on the right end, moves the entire image to the right side, and adds the cut off part to the left end (step S30). Accordingly, the image data can be shifted to the right direction.

When the determination of step S20 is NO, the user has shifted the image data in the left direction, and therefore the image shifting unit 27 acquires the movement amount to the left direction from the operation input accepting unit 21, cuts off the image data on the left end, moves the entire image to the left side, and adds the cut off part to the right end (step S40). Accordingly, the image data can be shifted to the left direction.

Note that depending on the image data, the information of the orientation of north, south, west, and east is associated with the horizontal position. In this case, the image shifting unit 27 is able to shift all of the image data items such that any one of north, south, west, or east is at the horizontal position (for example, north is at the center horizontal position), by automatic control or according to the user's operation. Therefore, the horizontal positions of all of the image data items can be automatically matched.

<Registration of Object Information in Object Information DB 1001>

The user is able to input object information in the image processing application, before the image processing application takes in the image data, after one or more image data items have been taken in, or after all of the image data items have been taken in.

Figure 18B:
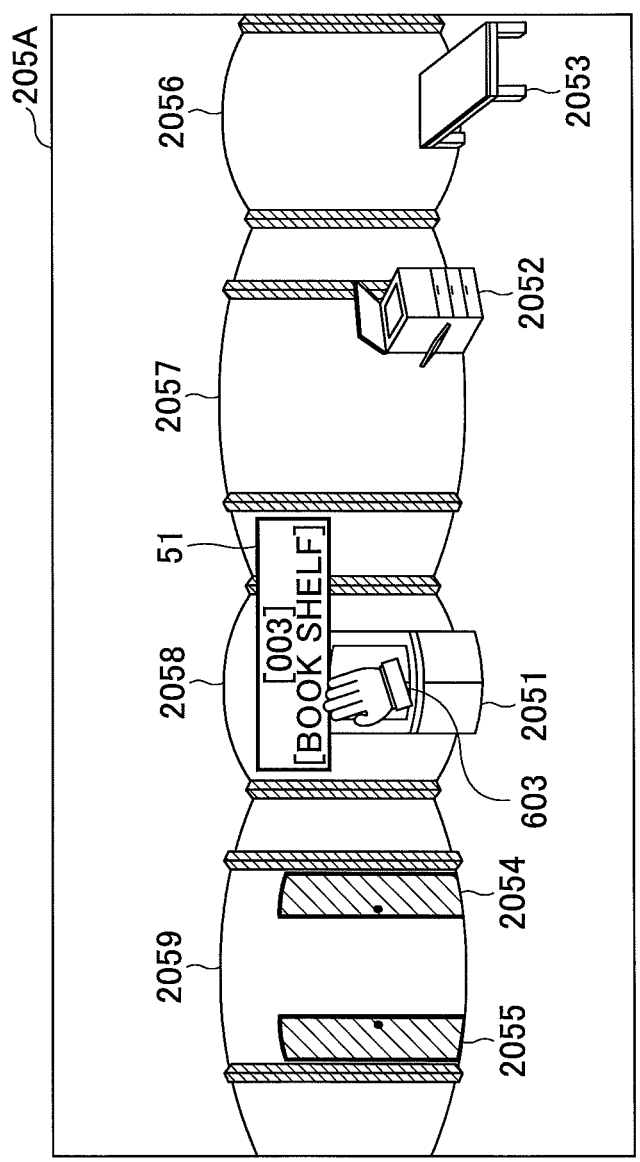

FIGS. 18A and 18B are examples of diagrams for schematically describing the input of object information in the information display field 503. The top part of FIG. 18A illustrates an example of the image data 205A in the image display field 502, and the bottom part of FIG. 18A illustrates an example of the information display field 503. In the initial state of the information display field 503, nothing is registered, but at least one record is displayed (in the initial state, the object information is not yet input, and therefore the field is blank without any values). The user looks at the image data in the image display field 502 and confirms the objects at the site, and registers the conveyance objects in the information display field 503.

In the top part of FIG. 18A, the bookshelf 2051, the copier 2052, and the desk 2053 are captured, and therefore the user registers these objects in the information display field 503. The information creating unit 23 applies a distribution ID that is not duplicate, to each record. Note that the same conveyance object is shown in a different image data item 205B; however, the user does not have to register the same conveyance object again.

Figure 19:
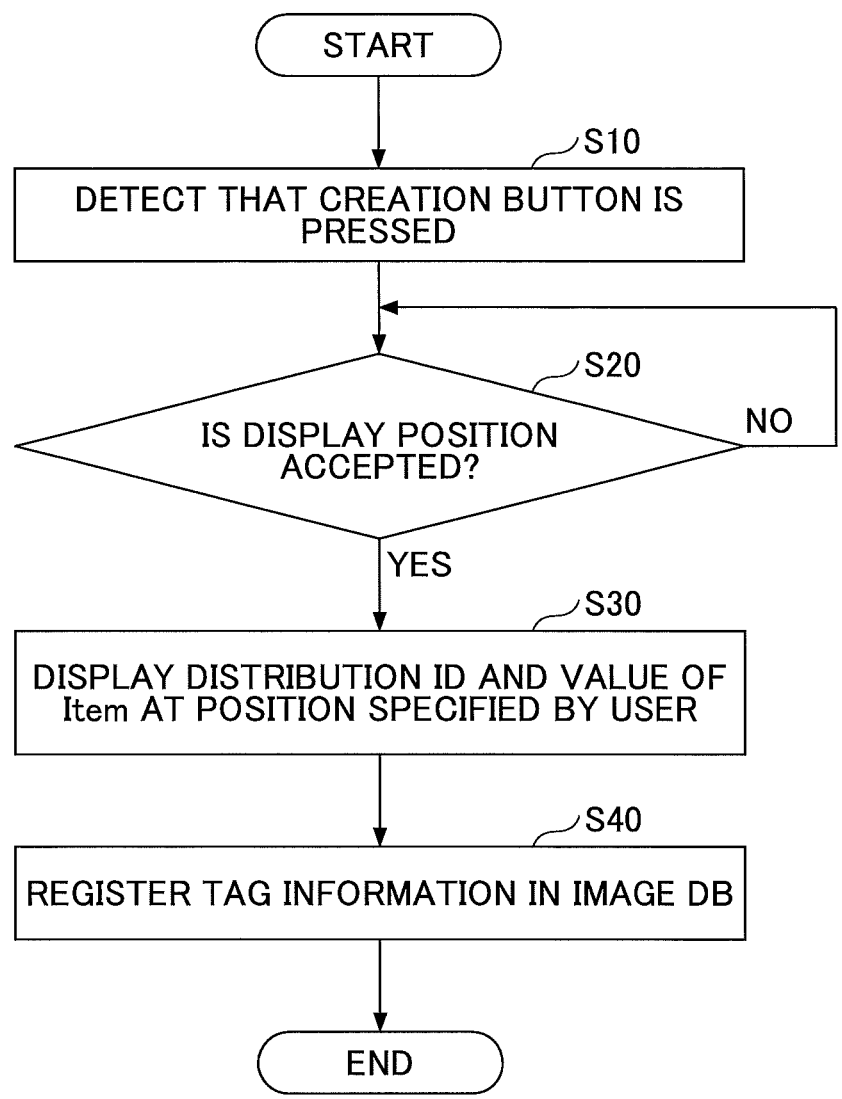
FIG. 19 is an example of a flowchart indicating procedures of displaying a tag in the image data by the image processing application according to an embodiment of the present invention.

Next, referring to FIG. 19, a description is given of a case where the user applies the tag 51. FIG. 19 is an example of a flowchart indicating procedures of displaying the tag 51 in the image data by the image processing application. The process of FIG. 19 is repeatedly executed, for example, while the image display field 502 is displayed.

First, it is assumed that the user has held down the creation button 504 for the bookshelf (distribution ID=003), and the operation input accepting unit 21 detects that the creation button 504 has been held down (step S10).

Next, the operation input accepting unit 21 determines whether a display position of the tag 51 has been accepted (step S20). The user uses the user's finger or the pointing device 603 such as a mouse to tap (click), for example, the bookshelf 2051 in the image data. The operation input accepting unit 21 detects the coordinates of the image data that has been taped or clicked by the user.

When the determination of step S20 is YES, the tag creating unit 25 displays the distribution ID and the value of the "Item" at the position specified by the user (step S30). That is, the operation input accepting unit 21 reports the distribution ID in the record of the information display field 503 for which the creation button 504 has been pressed, and the coordinates input by the pointing device 603, to the tag creating unit 25. Accordingly, the tag creating unit 25 identifies the record associated with the distribution ID in the object information DB 1001, and displays the distribution ID and the value of "Item" at the reported coordinates in the image data.

Next, the tag creating unit 25 registers the tag information in the image DB 1003 (step S40). That is, the tag creating unit 25 acquires the image ID of the image data in which the user has displayed the tag 51 from the operation input accepting unit 21, and registers the tag information (distribution ID and coordinates) in association with the corresponding image ID in the image DB 1003.

FIG. 18B is a diagram illustrating an example of image data to which the tag 51 is applied. The tag 51 is displayed on the bookshelf 2051, and "[003] [bookshelf]" is displayed inside the tag 51. Therefore, the user is able to display the tag 51 in the image data by a simple operation of pressing the creation button 504 and specifying the position of the tag 51.

Note that it is effective to change the display color of the tag 51 according to the value of "Note" in the object information DB 1001. That is, the color of the tag 51 changes according to the classification of air mail, sea mail, domestic moving, and domestic storage, and therefore the user can easily distinguish the conveyance objects being conveyed by the same distribution method.

Furthermore, as the tag 51, the tag creating unit 25 may display only a rectangular frame or a rectangle in which the frame is filled in, without including the distribution or "Item" (display as in the label described above). This is because, in a case where a plurality objects that are the same are shown in a plurality of image data items but only one of these objects is important, the user only needs to recognize the relationship of the one object, without the distribution ID or the "Item". Furthermore, for example, by changing the color of the tag 51 by objects having the same distribution ID, the objects can be identified without the distribution ID or the "Item".

Furthermore, the tag creating unit 25 may display only either one of the distribution ID or "Item" in the rectangular frame. Conversely, object information stored in the object information DB 1001 can be displayed in the rectangular frame of the tag 51, and therefore the tag creating unit 25 may display all of the fields of a single record. The user may set which value of field is to be displayed.

Furthermore, in FIG. 18B, the shape of the tag 51 is a rectangular frame; however, the shape of the tag 51 may be a point, a circle, an oval, a polygon, a star, or an indeterminate form. Furthermore, the tag creating unit 25 may display tags 51 of different shapes for each of the distribution IDs.

<Association of Tags>

When the same conveyance object is shown in different image data items, the user applies the tag 51 to the same conveyance object in each of the image data items. The user may or may not apply the tag 51; however, when a conveyance object is shown in the image data but the tag 51 is not applied to the conveyance object, it is unclear as to whether the conveyance object is registered in the object information DB 1001, and therefore it may be preferable to register the conveyance object in some cases.

Figure 20A:
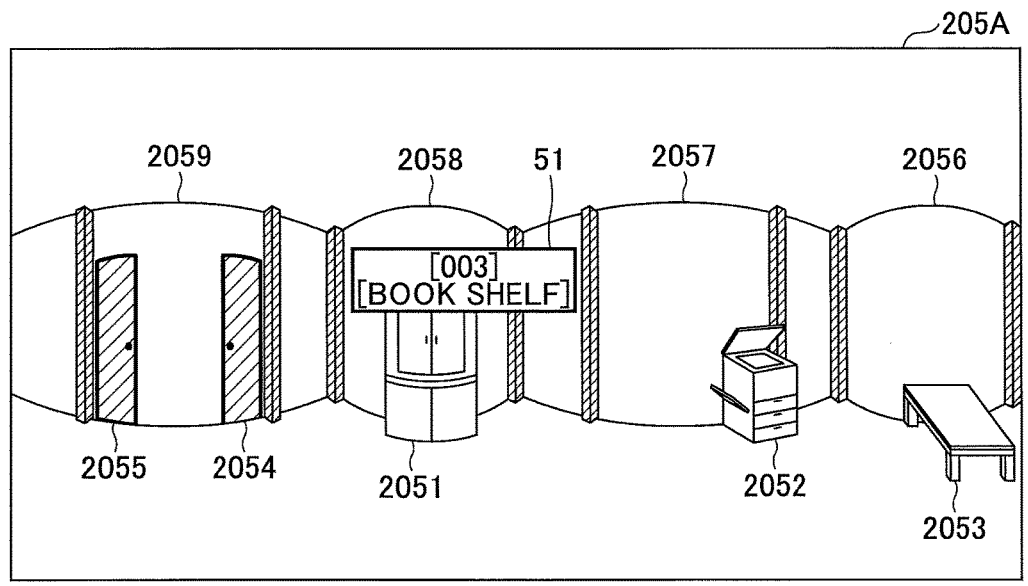
FIGS. 20A and 20B are examples of diagrams for describing the association of the same conveyance object according to an embodiment of the present invention.
Figure 20B:
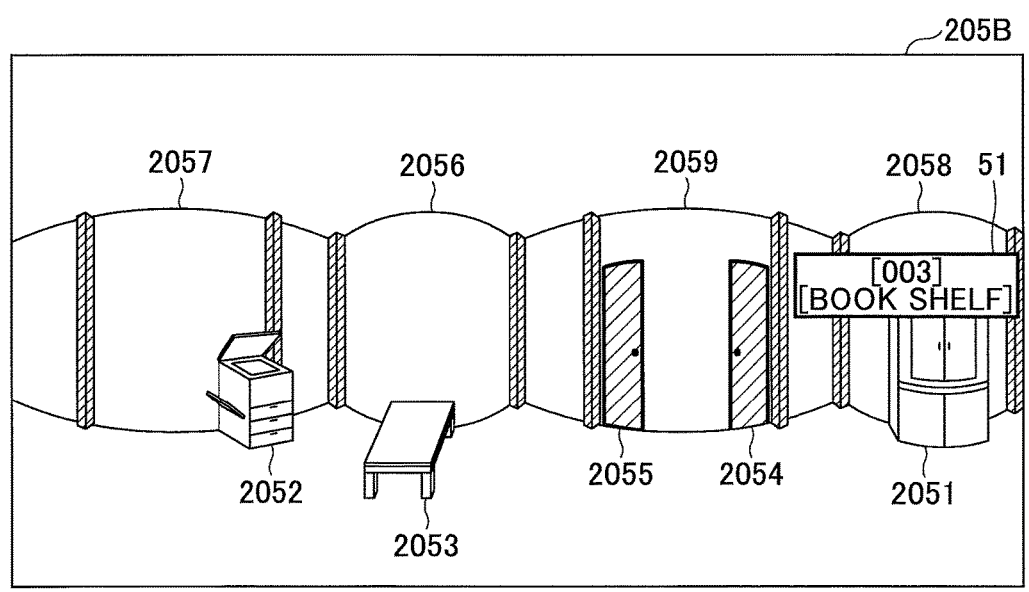

FIGS. 20A and 20B are examples of diagrams for describing the association of the same conveyance object. FIG. 20A illustrates the image data 205A in the image display field 502, and FIG. 20B illustrates the image data 205B in the image display field 502. As described with reference to FIG. 19, the user has applied the tag 51 to the bookshelf 2051 in both the image data 205A and the image data 205B.

When there are the same tags 51 in the image display field 502, the tag associating unit 24 connects the tags 51 with the line 52. "There are the same tags 51" means that there are the tags 51 having the same distribution ID in the image DB 1003.

Figure 21:
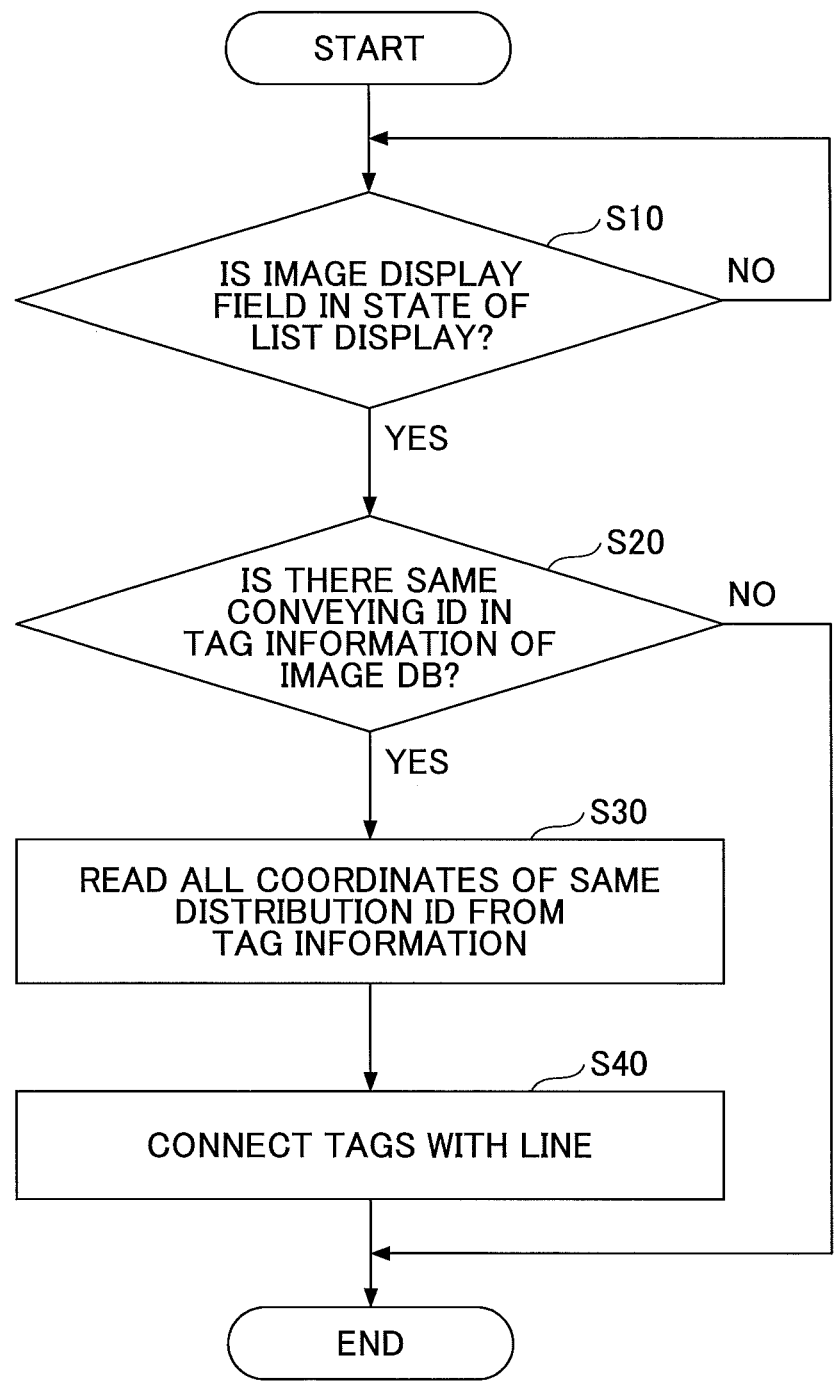
FIG. 21 is an example of a flowchart illustrating procedures of associating tags by the image processing application according to an embodiment of the present invention.

FIG. 21 is an example of a flowchart illustrating procedures of associating tags by the image processing application. The process of FIG. 21 is repeatedly executed, for example, while the image display field 502 is displayed.

First, the tag associating unit 24 determines whether the image display field 502 is in the state of list display (step S10). For example, the tag associating unit 24 may make this determination by receiving a report that the image display field 502 is in a state of list display from the display control unit 22, or by a flag indicating whether the image display field 502 is in a state of single display or in state of list display.

When the determination of step S10 is YES, the tag associating unit 24 determines whether distribution IDs that are the same are in the tag information in the image DB 1003

(step S20). This can be determined by searching for the same distribution IDs in the tag information of the image DB 1003.

When the determination of step S20 is YES, the tag associating unit 24 reads all of the coordinates of the same distribution IDs from the tag information in the image DB 1003 (step S30). When there are a plurality of groups including the same distribution IDs, all of the coordinates are read for each of the groups.

The tag associating unit 24 connects the tags 51 having the same distribution ID with the line 52 (step S40). Specifically, the coordinates of the frames of the tags 51 are known, and therefore the top left corners are connected by a line, or the line having the shortest distance, among all of the lines connecting all of the corresponding corners of two tags 51, is used to connect the tags 51.

Figure 22:
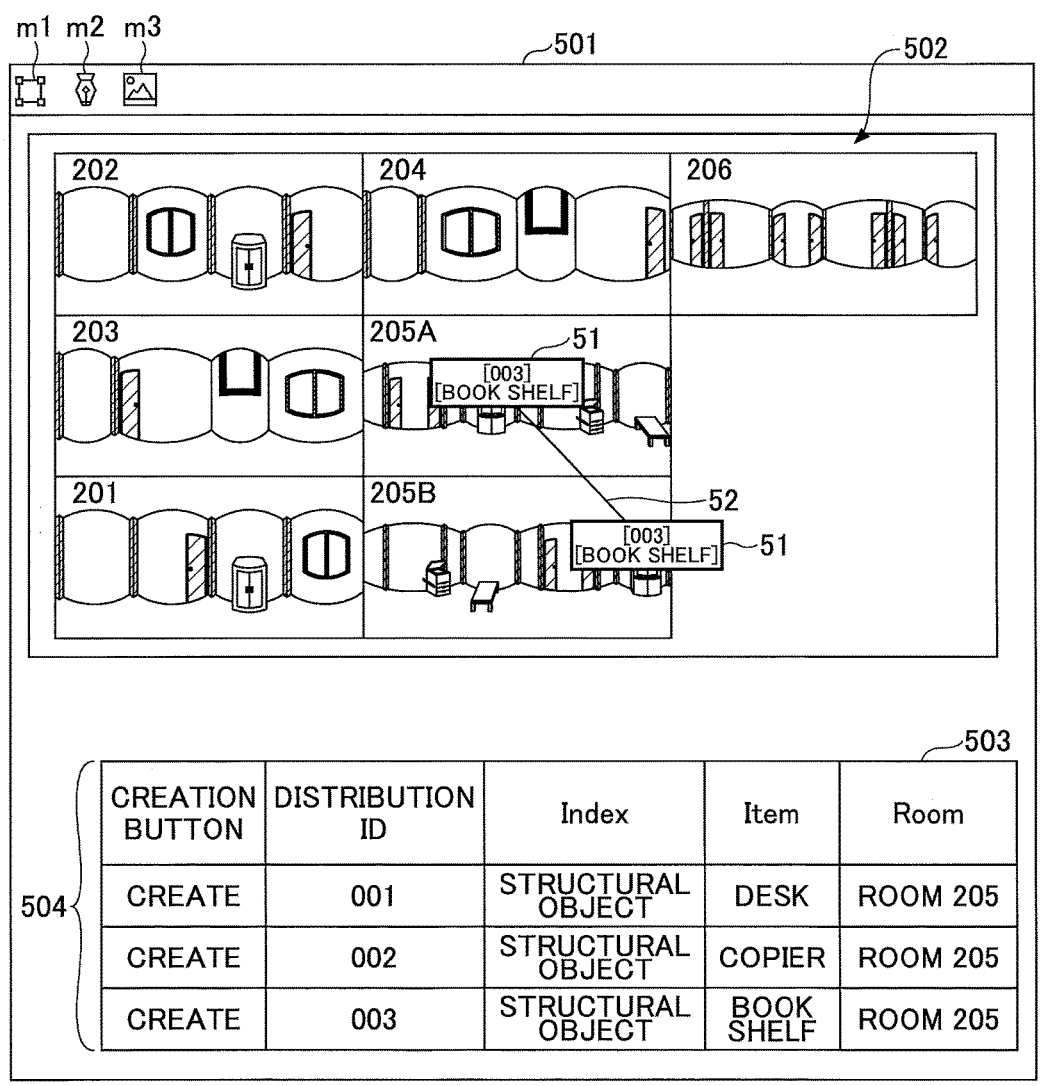
FIG. 22 is a diagram illustrating an example of a user interface of the image processing application in which the tags are connected by a line according to an embodiment of the present invention.

FIG. 22 illustrates an example of a user interface of the image processing application in which the tags are connected by a line. As illustrated, the tag 51 indicating "[003] [bookshelf]" of the bookshelf 2051 in the image data 205A and the tag 51 indicating "[003] [bookshelf]" of the bookshelf 2051 in the image data 205B are connected by the line 52. Therefore, the user can perceive at a glance that the two bookshelves 2501 are the same. Furthermore, different conveyance objects having the same shape are not connected by a line, and therefore the user can perceive at a glance that these conveyance objects are different.

The line 52 indicates that the bookshelves 2501 near the tags 51 in the both image data items 205A and 205B are the same object. That is, a display mode in which the tags 51 are connected by a line indicates that the bookshelves 2501 are the same object. For example, even if the tag 51 is not applied, by connecting the two objects with the line 52, it is possible indicate that these two objects are the same.

Figure 23A:
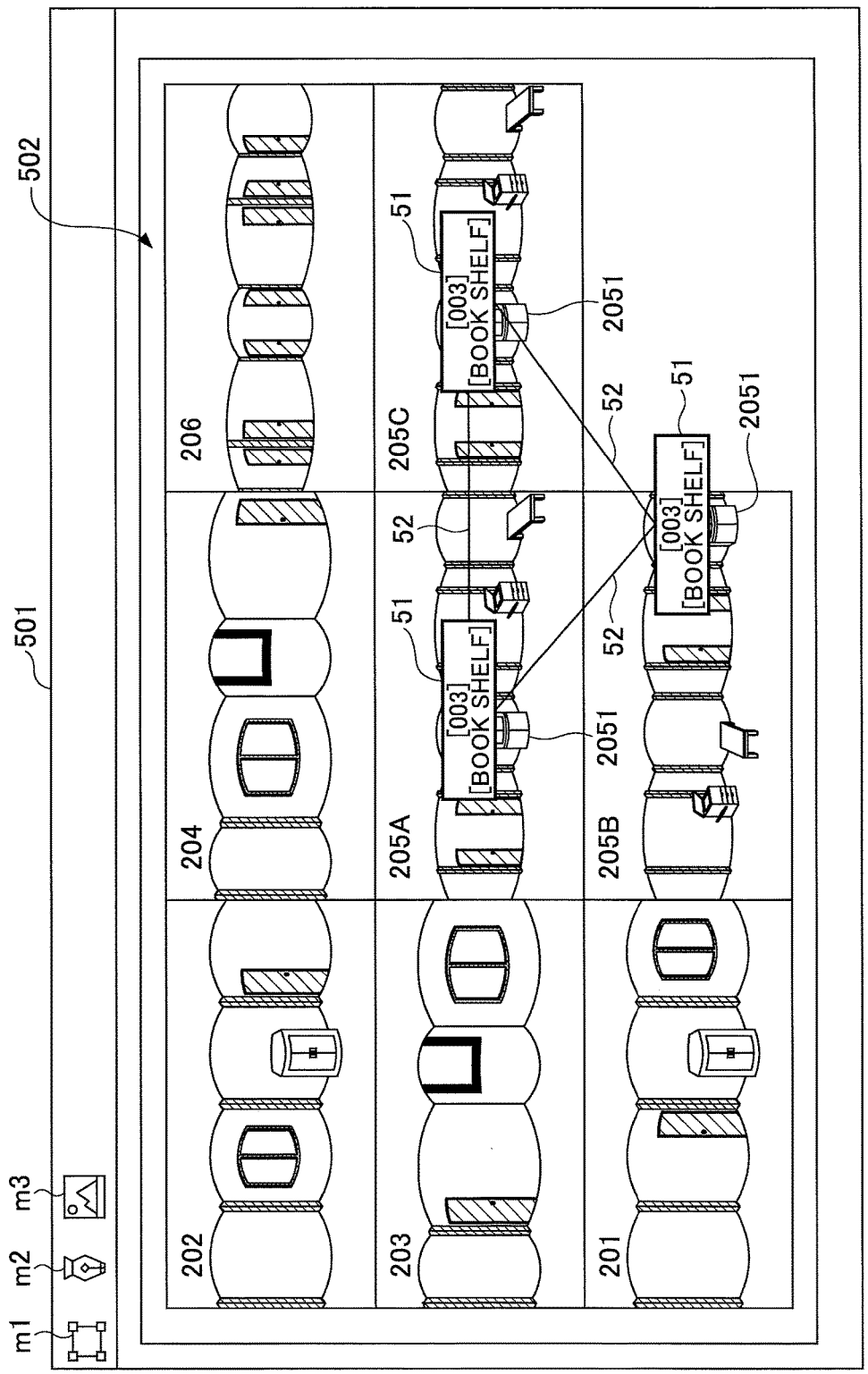
FIGS. 23A and 23B are examples of diagrams illustrating a user interface of the image processing application in which the tags are connected by a line according to an embodiment of the present invention.

In FIG. 22, two tags 51 are connected by a line; however, three or more tags 51 may be connected by lines if the tags 51 have the same distribution ID. In this case, as illustrated in FIG. 23A, the three tags 51 are connected to each other by lines. Note that in FIGS. 23A and 23B, for the purpose of description, the image data 205C captured at the imaging spot 205*c* in FIG. 7 is displayed.

When there are three or more of the same tags 51, the tag associating unit 24 may connect the tags 51 by the following methods.

Connect one tag 51 with all of the other tags 51 with lines.
Sequentially connect the tags 51 with lines starting from, for example, the nearest one to the left end (or the right end, top end, or the bottom end) in the image display field 502.
Connect the tags 51 such that the total length of the lines 52 is shortest.
Connect the tags 51 such that the number of times the lines 52 intersect each other is minimum.

Figure 23B:
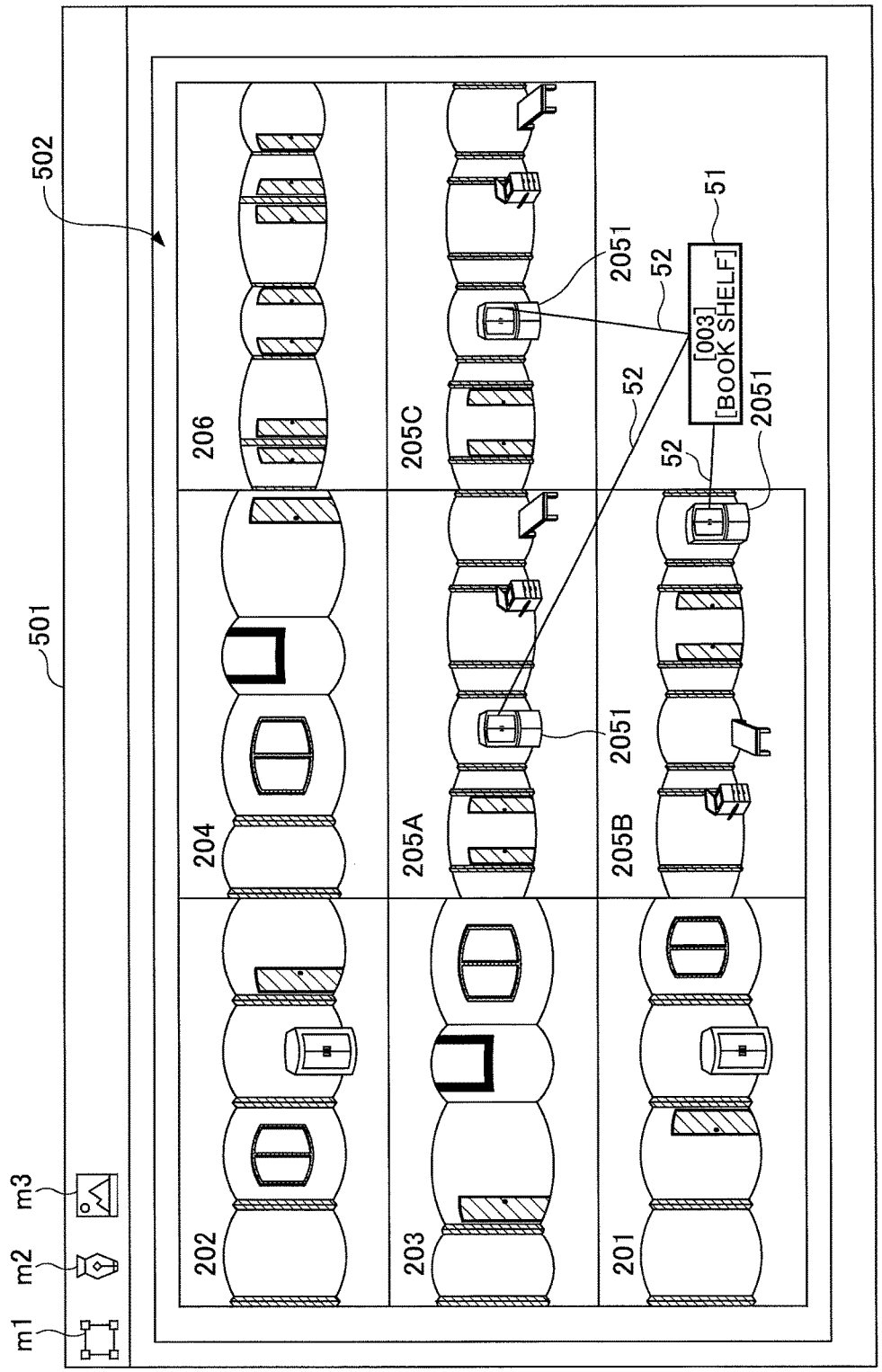

Furthermore, as illustrated in FIG. 23B, only one indication of "[003] [bookshelf]" may be displayed. The tags 51 are displayed at the tip of the three lines 52 starting from the conveyance object. In this display, there is only one indication of "[003] [bookshelf]", and therefore the visibility may be improved. Even when the tag 51 is displayed away from the object, it is possible to indicate that the objects shown in the plurality of image data items are the same object.

Note that in both cases of FIG. 22 and FIGS. 23A and 23B, the user may set whether to display a line. It is possible to indicate that objects near tags that are connected by a line are associated to (relevant to) each other. For example, when a user captures images with a camera of a regular angle of view from various positions in a situation where a plurality of vehicles are parked, the vehicle behind the user is unknown. In the present embodiment, a plurality of images are combined to two-dimensionally express how vehicles are parked in the surrounding space of 360 degrees, based on a reference "location" from which the images are captured.

Furthermore, the association of a plurality of tags 51 may be expressed by circling the plurality of tags 51 or by displaying the tags 51 by the same color or shape without connecting the tags 51 with lines 52. That is, the tags 51 of the same color or shape can express that the corresponding conveyance objects are the same objects.

Furthermore, the line 52 may be blinked, or the line 52 and the tag 51 may be blinked. The line 52 may be a double line, or the line 52 may be a curved line instead of a straight line. Furthermore, an arrowhead may be displayed on the line 52.

<Input of Handwriting Information>

Users may often want to write in a memo, a mark, or a number, etc., in the image data. The image processing application according to the present embodiment is also able to accept input of handwriting information in any image data.

Figure 24:
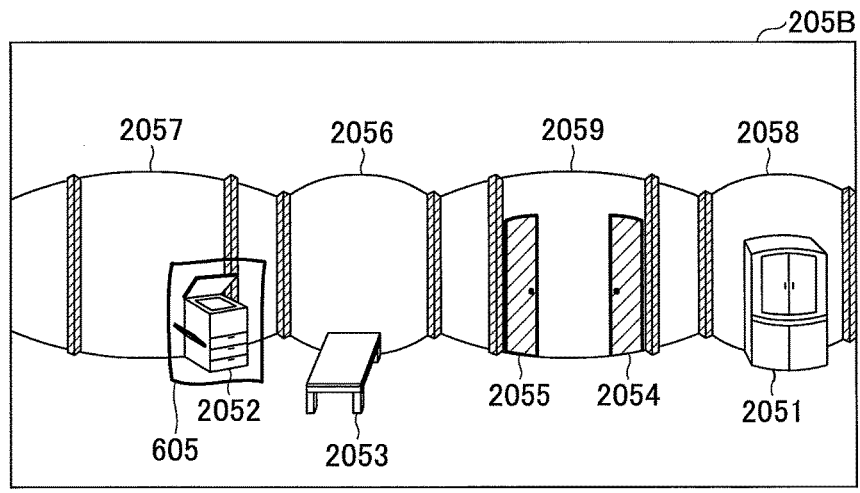
FIG. 24 is an example of a diagram for describing input of handwriting information in image data according to an embodiment of the present invention.
Figure 25:
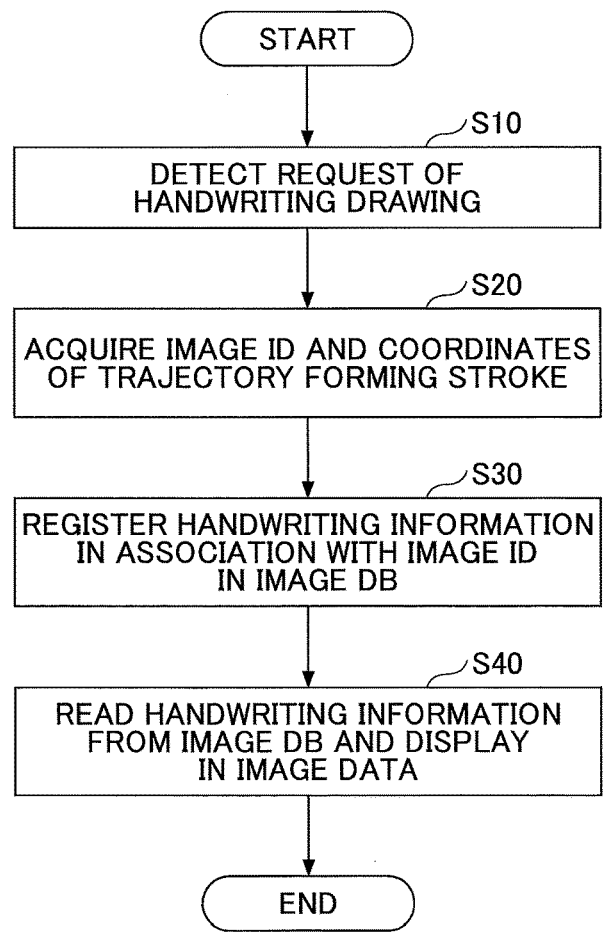
FIG. 25 is an example of a flowchart illustrating procedures of displaying handwriting information in image data by the image processing application according to an embodiment of the present invention.

FIG. 24 is an example of a diagram for describing input of handwriting information in image data, and FIG. 25 is an example of a flowchart illustrating procedures of displaying handwriting information in image data by the image processing application.

First, the user selects the menu m2 described with reference to FIG. 6. The operation input accepting unit 21 accepts the selection of the menu m2 (step S10).

The user uses the user's finger or the pointing device 603 such as a mouse to handwrite a stroke in the image data, and therefore the operation input accepting unit 21 acquires the image ID of the image data in which the user has handwritten the stroke and the coordinates of the trajectory forming the stroke (step S20). The operation input accepting unit 21 reports the image ID of the image data and the coordinates of the trajectory forming the stroke to the handwriting information drawing unit 26.

The handwriting information drawing unit 26 registers the handwriting information in association with the image ID in the image DB 1003 (step S30).

Then, the handwriting information drawing unit 26 reads the handwriting information from the image DB 1003, and uses the coordinates of the handwriting information to display the handwriting information in the image data (step S40). For example, the handwriting information drawing unit 26 arranges a transparent layer, which has the same size as the image data, on the image data, and the user draws handwriting information with a selected color. Accordingly, the handwriting information can be displayed by being superimposed on the image data.

In FIG. 24, handwriting information 605 is displayed so as to surround the copier 2052. The handwriting information 605 is stored in the image DB 1003, and therefore the user is able to display the handwriting information 605 any time when displaying the image data. Furthermore, the user is able to switch between displaying or not displaying the handwriting information 605.

The handwriting information 605 is formed of coordinates, and therefore the handwriting information 605 can be enlarged and reduced. The user selects the handwriting information 605 by the menu m1, and performs an enlarging operation or a reducing operation. The enlarging operation and the reducing operation are not limited; for example, a rectangular frame surrounding the handwriting information 605 is displayed, and the user moves an apex of the rectangular frame to the outside of the rectangular frame (enlarging operation) or to the inside of the rectangular frame (reducing operation). The handwriting information drawing unit 26 changes the X coordinates and the Y coordinates of the handwriting information 605 according to the magnification ratio of the enlarging operation or the reducing operation.

<Input Assistance of Object Information by Using Handwriting Information>

As described above, the user can input the object information in the image processing application from the information display field 503. Apart from using the information display field 503, the user can use the handwriting information 605 to input the object information in the image processing application.

FIGS. 26A through 26D are examples of diagrams schematically illustrating the registration of object information by using the handwriting information 605. FIG. 27 is an example of a flowchart illustrating procedures of inputting object information in the image processing application by the input supporting unit 29.

First, the operation input accepting unit 21 accepts the drawing of a handwriting frame 606 (step S10). A handwriting frame is a frame for performing character recognition on the handwriting information 605 input by the user. In order to distinguish the handwriting frame 606 from the handwriting information 605, the operation input accepting unit 21 detects that the handwriting frame 606 is drawn when a predetermined menu, etc., is pressed.

Next, the operation input accepting unit 21 determines whether a character 607 is drawn in the handwriting frame 606 (step S20). The operation input accepting unit 21 does not recognize whether the drawn stroke is a character, and therefore the determination of step S20 is to be done by determining whether something is drawn in the handwriting frame 606. The operation input accepting unit 21 stands by until the character 607 is drawn in the handwriting frame 606.

When the character 607 is drawn in the handwriting frame 606 (YES in step S20), the operation input accepting unit 21 reports the coordinates of the stroke to the input supporting unit 29, and the input supporting unit 29 recognizes the character 607 based on the coordinates (step S30). The input supporting unit 29 displays the result of character recognition in a recognition result frame 608.

Next, the input supporting unit 29 uses the result of character recognition to read candidate words starting with the recognized character from the dictionary DB 1002, and displays the candidate words in a candidate display field 609 (step S40).

Then, the input supporting unit 29 determines whether the input has been validated (step S50). The input being validated means that the user selects a word from the candidate display field 609 or the user selects the recognition result frame 608. The operation input accepting unit 21 accepts the selection of a word or the recognition result frame 608 selected by the user, from the candidate display field 609.

During the time until the input is validated (NO in step S50), the processes of steps S30 and S40 are repeated. During this time, the user continues handwriting strokes, and the input supporting unit 29 updates the recognition result of the recognition result frame 608 and the words in the candidate display field 609 according to the recognition results of characters.

When the input is validated (YES in step S50), the input supporting unit 29 reports the validated input of a word to the information creating unit 23, and therefore the information creating unit 23 registers the word in the object information DB 1001 (step S60). That is, a distribution ID that is not duplicate is assigned, and the word is registered in the field of "Item" in the object information DB 1001.

Next, the input supporting unit 29 performs a process of displaying the tag 51 of the conveyance object registered in the object information DB 1001 (step S70). First, the input supporting unit 29 acquires the image ID of the image data in which the user has drawn the handwriting frame 606 and coordinates relevant to the handwriting frame 606, via the operation input accepting unit 21. The coordinates relevant to the handwriting frame 606 are the coordinates of the center, the barycenter, or the position near the top left of the handwriting frame 606. Next, the input supporting unit 29 acquires the distribution ID of the conveyance object registered in the object information DB 1001, from the information creating unit 23. Then, the input supporting unit 29 reports the image ID of the image data, coordinates relevant to the handwriting frame, and the distribution ID, to the tag creating unit 25. The tag creating unit 25 registers the coordinates relevant to the handwriting frame and the distribution ID in association with the image ID, in the field of the tag information. Furthermore, the tag creating unit 25 displays and superimposes the tag 51 on the image data, based on the tag information.

Figure 26A:
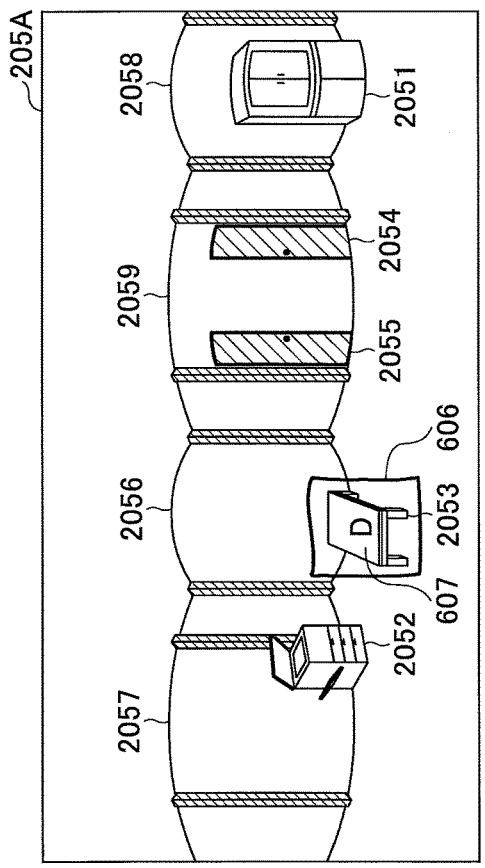
FIGS. 26A through 26D are examples of diagrams schematically illustrating the registration of object information using handwriting information according to an embodiment of the present invention.

A description is given by referring to FIGS. 26A through 26D. FIG. 26A illustrates the handwriting frame 606 and the character 607 drawn in the handwriting frame 606. The user has drawn the handwriting frame 606 so as to surround the desk 2053, and has handwritten a letter "D" in the handwriting frame 606. The input by the user to cause the application to perform character recognition is referred to as a gesture; however, the gesture is not limited to the handwriting frame 606, and the gesture may be an exclamation mark, a circle, a triangle, and a tick mark, etc., and may be any handwritten character or number. Note that the letter "D" is an example of a symbol, and symbols include a number, a Japanese hiragana character, a Chinese character, a Japanese katakana character, and an alphabetical letter, etc.

Figure 26B:
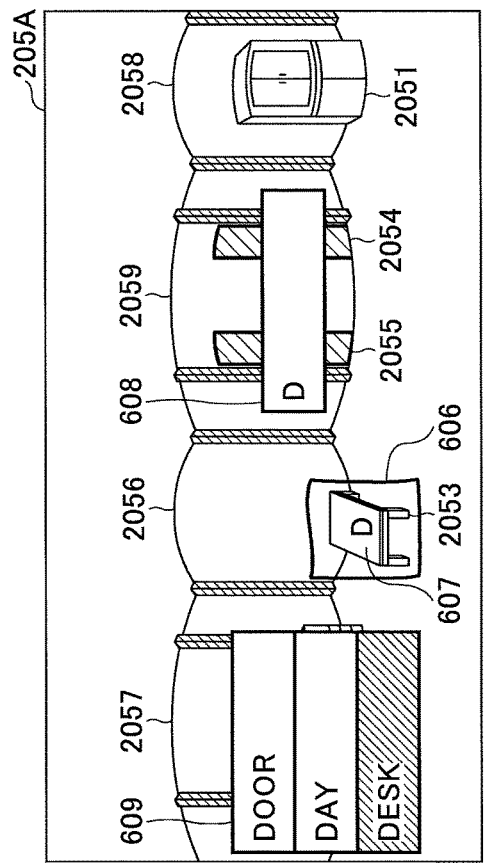
Figure 27:
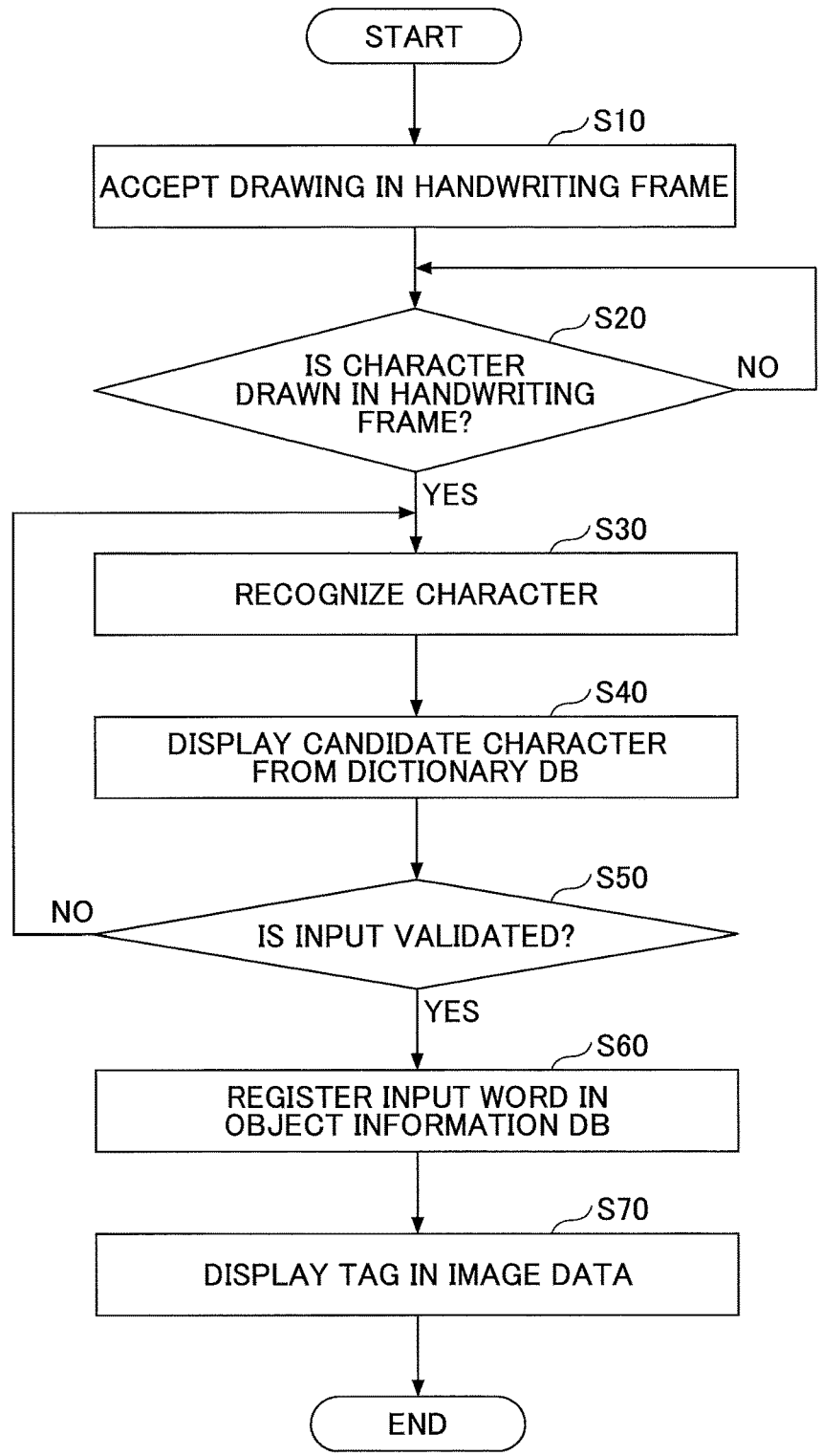
FIG. 27 is an example of a flowchart illustrating procedures of inputting object information in the image processing application by the input supporting unit according to an embodiment of the present invention.

FIG. 26B illustrates the recognition result frame 608 and words in the candidate display field 609. In the recognition result frame 608, "D" is displayed, and as candidate words, "door", "day", and "desk" are displayed. When there is a word expressing the conveyance object among the candidate words, the user can select the word with the user's finger or the pointing device 603 such as a mouse. In FIG. 26B, it is assumed that "desk" is selected.

Figure 26C:
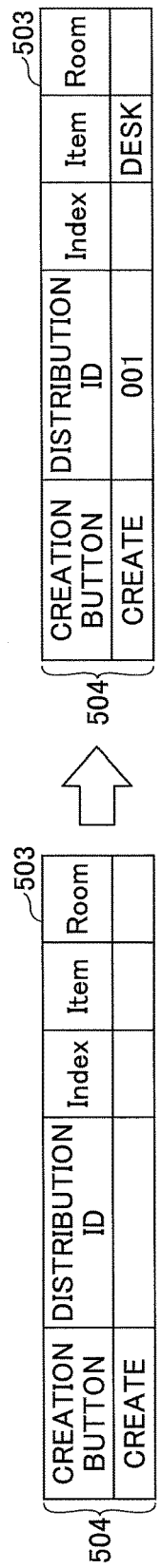

FIG. 26C illustrates the object information before the conveyance object is registered and the object information after the conveyance object is registered. The information creating unit 23 applies a distribution ID that is not duplicate and registers the distribution ID in the field of the distribution ID, and registers the word selected by the user in the field of "Item". Accordingly, the object information is registered without the user having to edit the information display field 503.

Figure 26D:
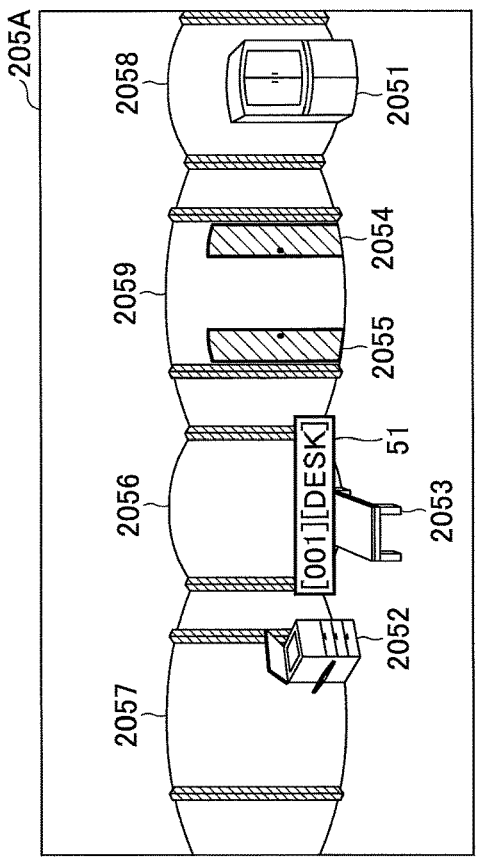

FIG. 26D illustrates the image data 205B in which the tag 51 is displayed. That is, as illustrated in FIG. 26C, the tag 51 including "[001] [desk]" registered in the object information DB 1001 is displayed.

Therefore, the can register the object information of the conveyance object in the object information DB 1001 by an intuitive operation of writing a character in the image data, and can also display the tag 51 of the conveyance object in the image data.

<Spherical Display of Image Data>

The image data is an omnidirectional image, and therefore the image processing application is able to spherically display the image data. By spherically displaying the image data as is viewed in the direction from the ceiling to the floor, the circumferential direction of the image data indicates north, south, west, and east. Therefore, the user can easily perceive the positional relationship of objects shown in the image data, and can easily recognize the relationship between the image data and the plan view 604.

The image processing application is able to spherically display the image data, not only two-dimensionally but also three-dimensionally, by using the image data of an equidistant cylindrical image to process the tag and the handwriting information, etc.

Figure 28A:
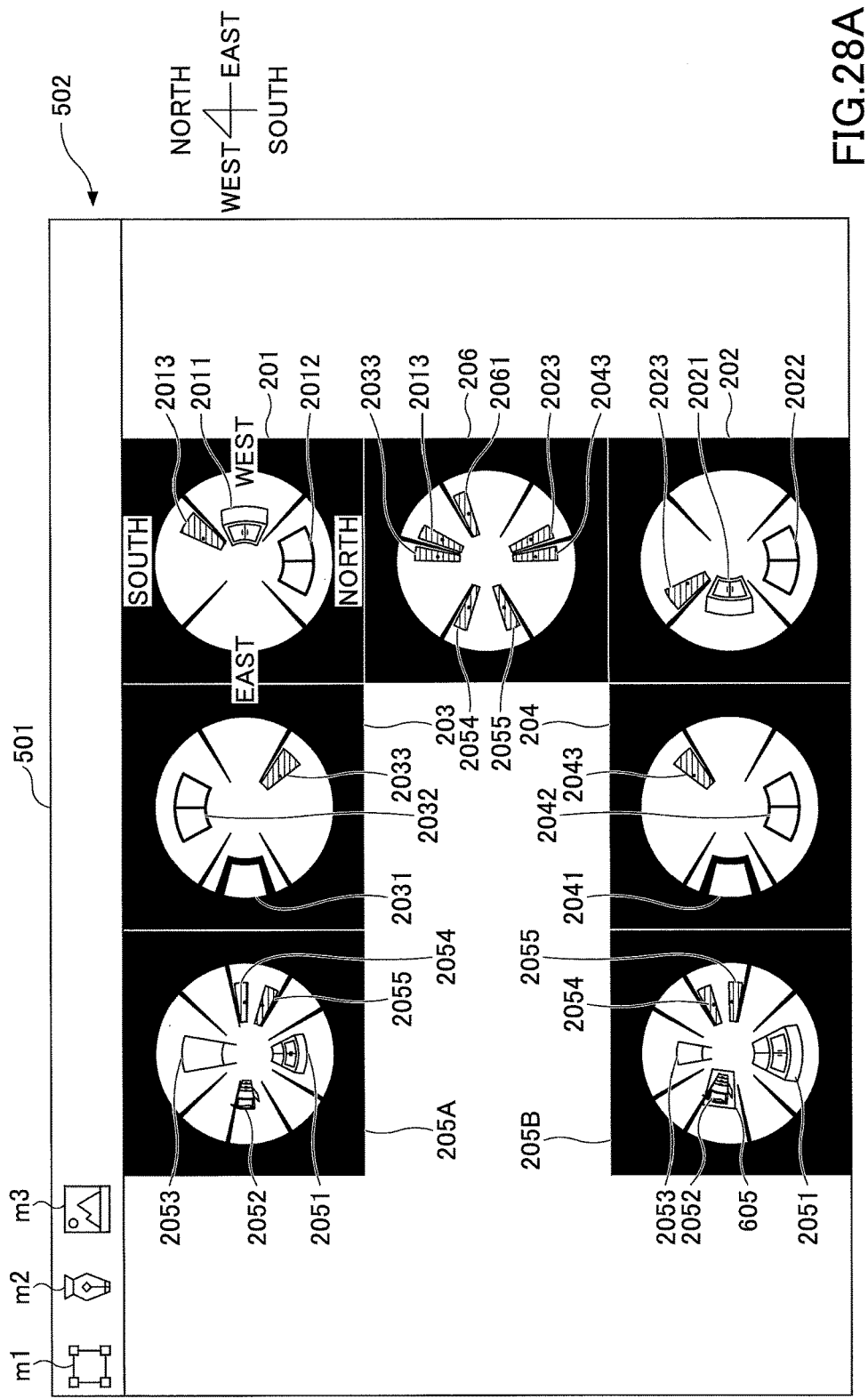
FIGS. 28A and 28B are diagrams illustrating image data spherically displayed in the image display field according to an embodiment of the present invention.
Figure 28B:
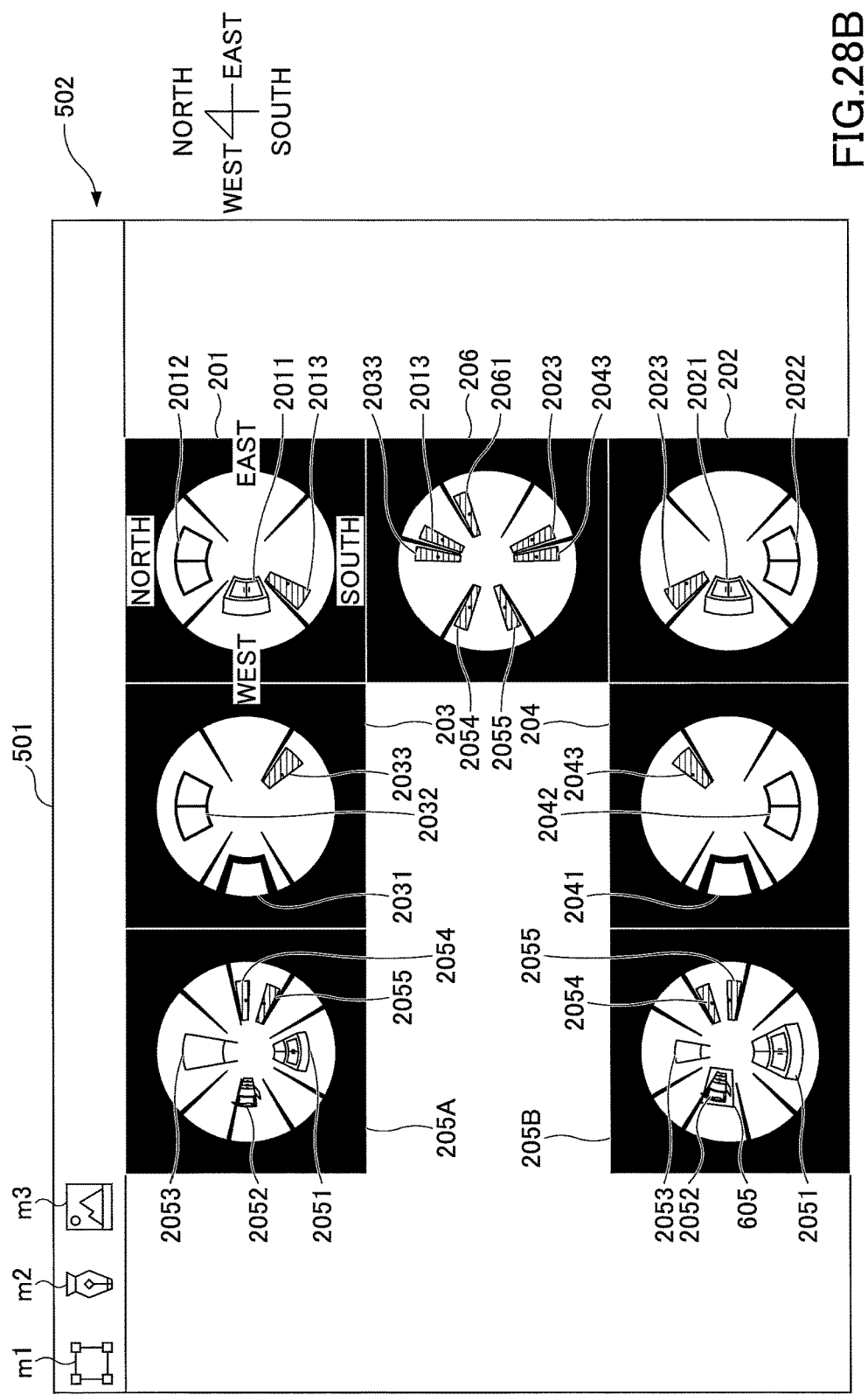

FIGS. 28A and 28B are diagrams illustrating image data spherically displayed in the image display field 502. The image data items 201 through 206 in FIGS. 28A and 28B correspond to the image data items in FIG. 10A through FIG. 13 displayed spherically. The image data items 201 through 206 in FIGS. 28A and 28B are views in the direction from the ceiling to the floor. Therefore, the closer an object is to the ceiling, the larger the object is displayed, and the closer an object is to the floor, the smaller the object is displayed.

The user can rotate the image data items 201 through 206 parallel to the sheet surface while comparing the image data items 201 through 206 with the plan view 604 of the floor of the moving source. Therefore, the orientation of the plan view 604 (the top of the image display field 502 is north, the bottom is south, the right is east, and the left is west) can be matched with orientation of the image data items 201 through 206. In FIG. 28A, the orientation of the image data does not match the plan view 604. Therefore, the user rotates the image data 201, and in FIG. 28B, the orientation of the image data 201 matches the plan view 604.

Note that the handwriting information 605 is also spherically displayed together with the image data items 201 through 206. In FIGS. 28A and 28B, the handwriting information 605 illustrated in FIG. 24 is displayed in the image data 205B. This is because the handwriting information is handwritten in the same coordinate system as the coordinate system of the image data items 201 through 206 expressed by equidistant cylindrical projection. Therefore, the hand handwriting information 605 can be displayed both in the spherically displayed image data and in the image data expressed by equidistant cylindrical projection of the image data items 201 through 206, without any shifts in the relative positions of the objects and the handwriting information 605. Also in the spherically displayed image data, the user is able to switch between displaying and not displaying the handwriting information 605.

Furthermore, by capturing a measurement providing object for which the actual size is known together with the object, it is possible to measure the size of the object and perform approximate measurements. The measurement providing object is described by referring to FIGS. 29 and 30.

Figure 29:
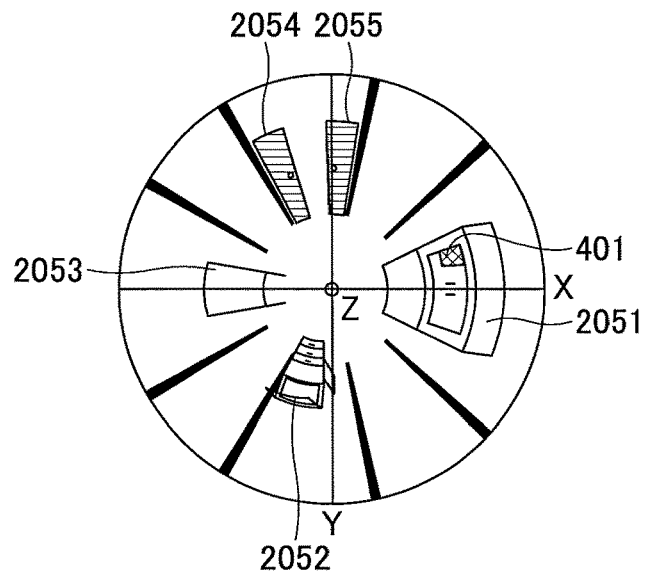
FIG. 29 is a diagram illustrating an example of the image data that is a spherically displayed image of an equidistant cylindrical image according to an embodiment of the present invention.

FIG. 29 illustrates the image data 205 that is a spherically displayed image of an equidistant cylindrical image. In FIG. 29, an X axis, a Y axis and a Z axis are illustrated. For example, the X axis and the Y axis are straight lines having a latitude of zero, extending through the middle of the spherically displayed image, and the X axis and the Y axis are orthogonal to each other. For example, the X axis is the direction connecting east and west, while the Y axis is the direction connecting north and south. The Z axis is a straight line having a latitude of 90 degrees, and the Z axis extends through the center of the spherically displayed image.

Furthermore, in the image data 205 in FIG. 29, a measurement providing object 401, which is attached to the bookshelf 2051 by the user, is captured. The measuring unit 33 uses the size of the measurement providing object 401 to calculate the size of the object and perform approximate measurements. The size of the measurement providing object 401 is already known, and is preferably a highly visible object such as a label, a sticker, and a paper sheet, etc. In order to measure the size, the measurement providing object 401 is preferably a square; however, the measurement providing object 401 may be any shape as long as there is a part for which the size is known.

Figure 30:
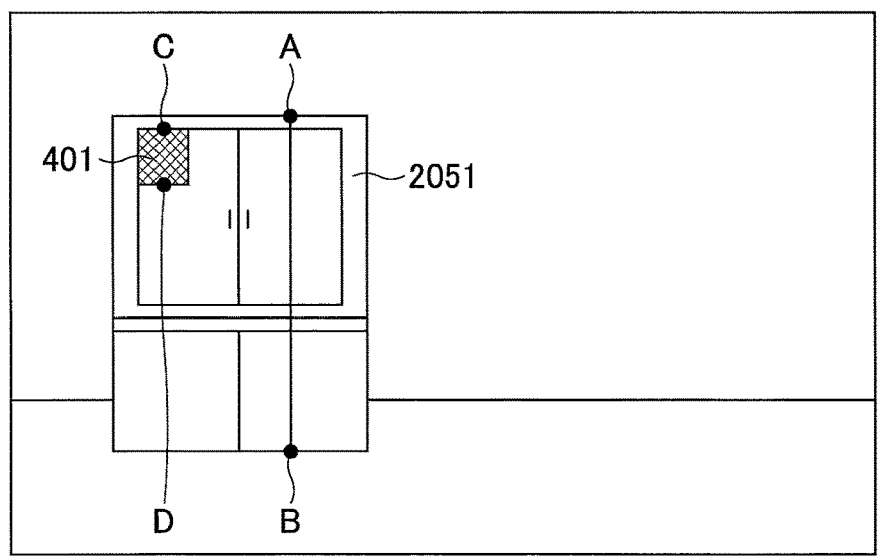
FIG. 30 is an example of a diagram for describing the method of calculating the size of a bookshelf according to an embodiment of the present invention.

First, referring to FIG. 30, a description is given of the calculation of the size of the bookshelf. FIG. 30 is an example of a diagram for describing the method of calculating the size of the bookshelf 2051. The user operates a pointing device to specify points A and B in FIG. 30. The operation input accepting unit 21 of the user terminal 100 accepts the specification of the points A and B (two first coordinates). The points A and B are determined so as to be parallel with the direction of the size that the user wants to know. In FIG. 30, the points A and B are specified in the height direction of the bookshelf 2051.

Next, the user operates a pointing device to specify points C and D (two second coordinates) in FIG. 30. The operation input accepting unit 21 of the user terminal 100 accepts the specification of points C and D. The points C and D are two end points of the part for which the user wants to know the size, and are two points in the same direction as the direction of a line connecting points A and B. The measuring unit 33 calculates the size (height) of the bookshelf 2051 based on the ratio of the an angle cd in the latitudinal direction of the points C and D (difference between the two coordinates of the points C and D) and an angle ab in the latitudinal direction of the points A and B (difference between the two coordinates of the points A and B), and the size of the measurement providing object 401. Based on a simple proportion relationship, the following formula is obtained.

angle cd: angle ab=size of bookshelf 2051:size of measurement providing object By the above calculation, the size of the bookshelf 2051 can be obtained.

The same applies when making measurements. For example, the user connects two walls to be measured by a straight line, and calculates the ratio between the line and the size of the measurement providing object 401, to make an approximate measurement.

Note that there are the following factors of error. When the distance between the imaging position and an object is long, the imaging range of het object becomes small, and the user has difficulty in specifying the correct points. Thus, the points specified by the user are shifted. Then, a conversion error occurs when converting from an equidistant cylindrical image to a spherically displayed image. Therefore, it is preferable to capture a large image of the object.

<Server-Client Method>

In the above description, the user terminal 100 operates by a so-called stand-alone method. However, the image processing application according to the present embodiment is also applicable to a server-client method.

Figure 31:
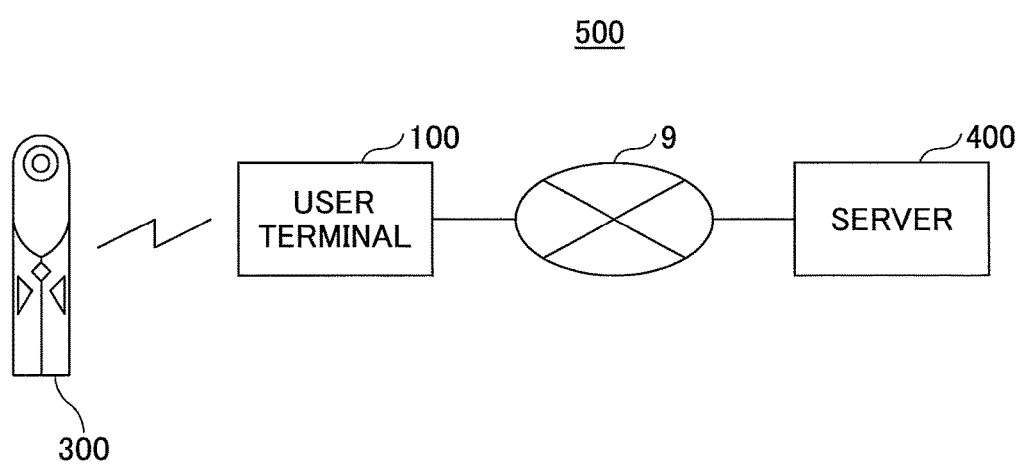
FIG. 31 is an example of a configuration diagram of the image processing system in which the image processing application operates by a server-client method according to an embodiment of the present invention.

FIG. 31 is an example of a configuration diagram of the image processing system 500 in which the image processing application operates by a server-client method. The user terminal 100 and a server 400 are connected via a network 9. In the user terminal 100, the browser software operates, and as a request is given to the server 400, the server 400 executes a web application. The server 400 sends a program described in Hyper Text Markup Language (HTML) (or eXtensible Markup Language (XML)), JavaScript (registered trademark), and Cascading Style Sheets (CSS), etc., to the user terminal 100. The user terminal 100 executes this program to obtain the same execution results as the execution results of the image processing application described above. Note that the server can respond to cloud computing.

Note that the hardware configuration of the server 400 is to have a configuration of an information processing apparatus similar to the user terminal 100 illustrated in FIG. 3. Even if the hardware configurations are different, it is assumed that such a difference does not affect the description of the present embodiment. Furthermore, also in the server-client method, the user terminal 100 includes at least the operation input accepting unit 21 and the display control unit 22. Other functional units may be included in the user terminal 100 or the server 400.

Figure 32:
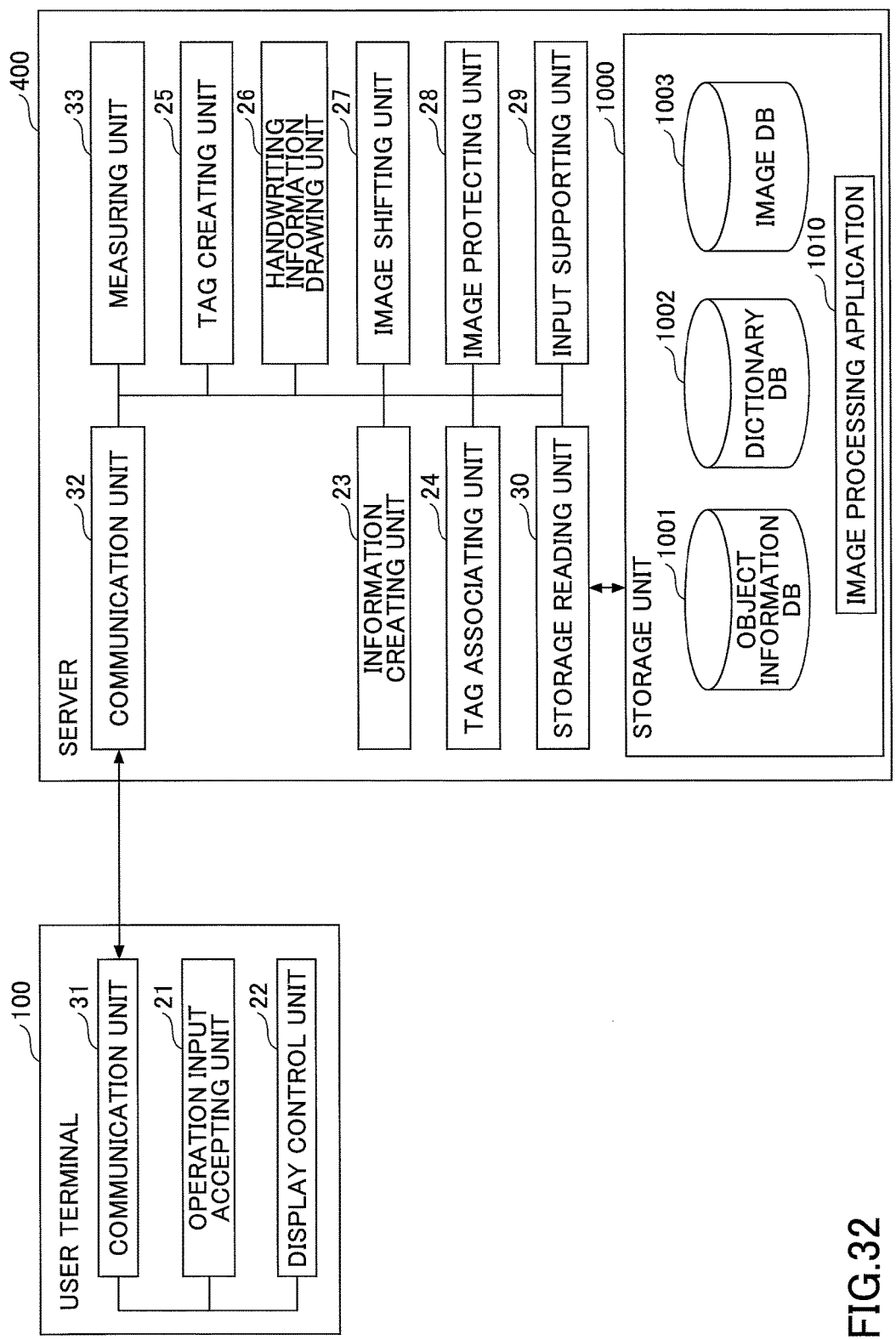
FIG. 32 is an example of a functional block diagram of the image processing system in a case where the server includes the main functions according to an embodiment of the present invention.

FIG. 32 is an example of a functional block diagram of the image processing system 500 in a case where the server 400 includes the main functions. The user terminal 100 and the server 400 respectively include communication units 31 and 32; however, the functions included in the server 400 are the same as the functions of the user terminal 100 of the stand-alone method.

The communication unit 31 of the user terminal 100 sends a HyperText Transport Protocol (HTTP) request, etc., according to the user's operation. The communication unit 32 of the server 400 receives the HTTP request, and the storage reading unit 30 of the server 400 reads object information, words, and image data according to processes, from the object information DB 1001, the dictionary DB 1002, and the image DB 1003. The process contents may be the same as the process contents by the user terminal 100; however, the above program is constructed by object information, words, and image data and the communication unit 32 sends the program to the user terminal 100. That is, the server 400 creates a program, in which the tag 51 is applied to image data and tags 51 are associated with each other, and sends the program to the user terminal 100.

Other Application Examples

The best mode for carrying out the present invention is described above by using embodiments; however, the present invention is not limited to the specific embodiments described in the detailed description, and variations and replacements may be made without departing from the spirit and scope of the present invention.

For example, the object information in the information display field 503 may be translated by the image processing application into English, Chinese, or French, etc. Furthermore, the object information in the information display field 503 before or after translation may be printed. As a matter of course, the image data in the image display field 502 may also be printed.

Furthermore, when an office, etc., moves overseas, customs documents are requested. Therefore, the image data and the object information may be output in a format adapted to the customs documents of the respective countries.

Furthermore, there are cases where the conveyance objects are insured when moving. Therefore, the image data and the object information may be output in a format adapted to insurance documents of the respective insurance companies.

Furthermore, the configuration example of FIG. 5, etc., indicated in the above embodiment is divided according to the main functions to facilitate the understanding of processes by the image processing system 500. The present invention is not limited by how the process units are divided or the names of the process units. The processes of the user terminal 100 may be further divided into many process units according to the process contents. Furthermore, the process units may be divided such that a single process unit further includes many processes.

Furthermore, one or more of the object information DB, the dictionary DB, and the image DB illustrated in the storage unit 1000 of FIGS. 5 and 30 may be present in a network.

Note that the image DB 1003 is an example of an image storage unit, the object information DB 1001 is an example of an object information storage unit, the storage reading unit 30 is an example of a reading unit, the display control unit 22 is an example of an image display unit, the operation input accepting unit 21 is an example of an operation accepting unit, the tag creating unit 25 is an example of an indication information display unit, and the tag associating unit 24 is an example of an associating unit. The information creating unit 23 is an example of an information registering unit, the operation input accepting unit 21 is an example of a recognizing unit, the image shifting unit 27 is an example of an image shifting unit, the handwriting information drawing unit 26 is an example of a handwriting information display unit, and the image protecting unit 28 is an example of an image protection releasing unit. The communication unit 32 is an example of a receiving unit. The measuring unit 33 is an example of a measuring unit, and the communication unit 32 is an example of a sending unit. The method of displaying image data performed by the user terminal 100 is an example of an image display method.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programmed by software to execute the corresponding functions and hardware which is designed to execute the corresponding functions such as the ASIC and the circuit module.

The computer program product, the image display method, and the image processing system are not limited to the specific embodiments described in the detailed description, and variations and modifications may be made without departing from the spirit and scope of the present invention.

What is claimed is:

1. A non-transitory computer-readable storage medium containing instructions that cause an information processing apparatus to execute a process comprising:

reading an image data item from an image storage unit storing a plurality of image data items, and reading object information from an object information storage unit in which the object information relating to an object shown in the image data item is stored in association with identification information for identifying the object;

displaying, by a display device, a plurality of the image data items that have been read and the object information;

accepting a selection of the object based on the object information displayed by the display device, and accepting a specification of a position of the object with respect to the image data item displayed by the display device;

displaying, in association with each other, the specified positions of the objects that have the same identification information, among the objects shown in different ones of the image data items for which the specifications of the positions have been accepted;

displaying an indication information item indicating the object, at the position specified by the accepted specification; and accepting input of a name of the object as one item of the object information, applying the identification information to the name of the object, and storing the name in the object information storage unit in association with the identification information, wherein the displaying of the specified positions in association with each other includes expressing that the objects, which are shown at the positions displayed in association with each other in the different ones of the image data items, are the same; and the displaying of the specified positions in association with each other includes reading, from the object information storage unit, at least one of the identification information and the name associated with each other in the object information of the object for which the selection has been accepted, and displaying the at least one of the identification information and the name together with the indication information item, when the selection of the object and the specification of the position of the object with respect to the image data displayed on by the display device are accepted.

2. The non-transitory computer-readable storage medium according to claim 1, wherein the displaying of the specified positions in association with each other includes displaying a line connecting the indication information items of the objects, which are displayed in the different ones of the image data items and which have the same identification information.

3. The non-transitory computer-readable storage medium according to claim 2, the process further comprising:

recognizing at least one symbol that is handwritten in the image data item; and acquiring a result of the recognition, generating the identification information, and storing the identification information and the at least one symbol in association with each other in the object information storage unit, wherein the displaying of the indication information item includes displaying the indication information item and the at least one symbol around a location where the at least one symbol has been recognized in the image data item.

4. The non-transitory computer-readable storage medium according to claim 1, the process further comprising:

cutting off an image on a right end of the image data item and adding the cut off image to a left end of the image data item, when an operation of shifting the image data item in a right direction is accepted in a state where the image data item is displayed by the display device by equidistant cylindrical projection, and cutting off an image on the left end of the image data item and adding the cut off image to the right end of the image data item, when an operation of shifting the image data item in a left direction is accepted in a state where the image data item is displayed by the display device by equidistant cylindrical projection, wherein scenery of 360 degrees in at least a horizontal direction is captured in the one image data item.

5. The non-transitory computer-readable storage medium according to claim 1, the process further comprising:

releasing a visibility reduction process performed on the image data item that has been input to the information processing apparatus, wherein the releasing includes releasing the visibility reduction process only with respect to accepted coordinates when input of the coordinates in the image data item is accepted, and storing the image data item for which the visibility reduction process has been released in the image storage unit.

6. The non-transitory computer-readable storage medium according to claim 1, wherein the image data item is an omnidirectional image in which scenery of 360 degrees is captured, and the displaying of the plurality of the image data items and the object information includes displaying the plurality of the image data items by equidistant cylindrical projection or spherically displaying the plurality of the image data items.

7. The non-transitory computer-readable storage medium according to claim 1, wherein the displaying of the plurality of the image data items and the object information includes:

displaying each of the plurality of the image data items in a cell in an area divided into the cells; and changing the cell in which the image data item is arranged when an instruction to move the image data item from a movement source cell to a movement destination cell is accepted.

8. The non-transitory computer-readable storage medium according to claim 1, wherein the image data item is an omnidirectional image in which scenery of 360 degrees is captured, and the displaying of the plurality of the image data items and the object information includes rotating the plurality of the image data items by an amount of an accepted rotation instruction, when the rotation instruction to rotate the image data item in a horizontal direction is accepted.

9. The non-transitory computer-readable storage medium according to claim 1, the process further comprising:

accepting input of handwriting information with respect to the image data item, and displaying the handwriting information by the display device.

10. The non-transitory computer-readable storage medium according to claim 9, wherein the displaying of the plurality of the image data items and the object information includes spherically displaying the handwriting information when the image data item is spherically displayed.

11. The non-transitory computer-readable storage medium according to claim 9, the process further comprising:

measuring a distance between two second coordinates based on a difference between two first coordinates, a difference between the two second coordinates, and a size of a measurement providing object shown in the image data item, the size of the measurement providing object being already known, wherein the accepting of the input of the handwriting information includes accepting the two first coordinates input with respect to the measurement providing object by a pointing device and accepting the two second coordinates input with respect to the image data item by the pointing device.

12. A method for displaying images executed by an information processing apparatus, the method comprising:
   reading an image data item from an image storage unit storing a plurality of image data items, and reading object information, from an object information storage unit in which the object information relating to an object shown in the image data item is stored in association with identification information for identifying the object;
   displaying, by a display device, a plurality of the image data items that have been read and the object information;
   accepting a selection of the object based on the object information displayed by the display device, and accepting a specification of a position of the object with respect to the image data item displayed by the display device;
   displaying, in association with each other, the specified positions of the objects that have the same identification information, among the objects shown in different ones of the image data items for which the specifications of the positions have been accepted;
   displaying an indication information item indicating the object, at the position specified by the accepted specification; and
   accepting input of a name of the object as one item of the object information, applying the identification information to the name of the object, and storing the name in the object information storage unit in association with the identification information, wherein
      the displaying of the specified positions in association with each other includes expressing that the objects, which are shown at the positions displayed in association with each other in the different ones of the image data items, are the same; and
      the displaying of the specified positions in association with each other includes reading, from the object information storage unit, at least one of the identification information and the name associated with each other in the object information of the object for which the selection has been accepted, and displaying the at least one of the identification information and the name together with the indication information item, when the selection of the object and the specification of the position of the object with respect to the image data displayed on by the display device are accepted.

13. An image processing system in which a terminal and an information processing apparatus are connected via a network, the image processing system comprising:
   one or more hardware processors; and
   one or more hardware memories containing instructions that cause the one or more hardware processors to:
      read an image data item from an image storage unit storing a plurality of image data items, and read object information, from an object information storage unit in which the object information relating to an object shown in the image data item is stored in association with identification information for identifying the object;
      send, to the terminal, a plurality of the image data items and the read object information and display the plurality of the image data items and the object information by a display device at the terminal;
      receive information accepted by the terminal, the accepted information including a selection of the object based on the object information displayed by the display device, and a specification of a position of the object with respect to the image data item displayed by the display device;
      display, in association with each other, the specified positions of the objects that have the same identification information, among the objects shown in different ones of the image data items for which the specifications of the positions have been accepted;
      display an indication information item indicating the object, at the position specified by the accepted specification; and
      accept input of a name of the object as one item of the object information, applying the identification information to the name of the object, and store the name in the object information storage unit in association with the identification information, wherein
         the display of the specified positions in association with each other includes expressing that the objects, which are shown at the positions displayed in association with each other in the different ones of the image data items, are the same; and
         the display of the specified positions in association with each other includes reading, from the object information storage unit, at least one of the identification information and the name associated with each other in the object information of the object for which the selection has been accepted, and displaying the at least one of the identification information and the name together with the indication information item, when the selection of the object and the specification of the position of the object with respect to the image data displayed on by the display device are accepted.

* * * * *